United States Patent Office 3,226,397
Patented Dec. 28, 1965

3,226,397
3-FORMYL- AND 3-LOWER ALKANOYL-4,-7-
INDOLOQUINONES
George Rodger Allen, Jr., Old Tappan, N.J., and John Frank Poletto, Nanuet, N.Y., assignors to American Cyanamid Company, Stamford, Conn., a corporation of Maine
No Drawing. Filed Aug. 7, 1964, Ser. No. 388,279
12 Claims. (Cl. 260—319)

This application is a continuation-in-part of our copending application Serial No. 315,711, filed October 11, 1963, now abandoned.

This invention relates to new organic compounds and, more particularly, is concerned with novel substituted 3-formyl- and 3-lower alkanoyl-4,7-indoloquinones and with novel methods of preparing these compounds. The novel substituted 3-formyl- and 3-lower alkanoyl-4,7-indoloquinones of the present invention may be represented by the following general formula:

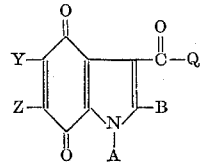

wherein A is hydrogen, lower alkyl, ω-(halo)lower alkyl, ω-(lower alkylthio)lower alkyl, ω-(hydroxy)lower alkyl, ω-(tetrahydropyranyloxy)lower alkyl, ω-(azido)lower alkyl or ω-(mercapto)lower alkyl; B is hydrogen, lower alkyl, hydroxymethyl, tetrahydropyranyloxymethyl, lower alkoxycarbonyl or carboxamido; Q is hydrogen or lower alkyl; Y is hydrogen, hydroxy, lower alkoxy, halogen, lower alkyl, lower alkylthio, lower alkylamino, phenylthio or p-(lower alkyl)phenylthio; Z is hydrogen, lower alkyl, amino, bromine, lower alkoxy, lower alkylamino, phenylthio or p-(lower alkyl)phenylthio. Suitable lower alkyl and lower alkoxy groups contemplated by the present invention are those having up to about 6 carbon atoms. Suitable ω-substituted lower alkyl groups are those having from 2 to 4 carbon atoms while halogen is exemplified by fluorine, chlorine, bromine and iodine.

The novel compounds of the present invention are obtainable as crystalline materials having characteristic melting points and absorption spectra. They are appreciably soluble in many organic solvents such as lower alkanols, acetone, ethyl acetate, and the like. They are, however, generally insoluble in water.

The novel substituted 3-formyl- and 3-lower alkanoyl-4,7-indoloquinones of the present invention are useful as intermediates in the preparation of the biologically active 3-(α-carbamoyloxyalkyl)-4,7-indoloquinones and 3-(α-acyloxyalkyl)-4,7-indoloquinones as is set forth in greater detail in our copending applications Ser. Nos. 315,710 (now abandoned); 315,695; and 315,674; filed October 11, 1963. In particular, reduction of the 3-formyl- and 3-lower alkanoyl-4,7-indoloquinones, followed by oxidation of the hydroquinones thus formed with a reagent such as ferric chloride, gives the corresponding 3-(α-hydroxyalkyl)-4,7-indoloquinones. For this reduction, sodium borohydride is the preferred reducing agent. Treatment of a 3-(α-hydroxyalkyl)-4,7-indoloquinone with an acylating agent furnishes the corresponding 3-(α-acyloxyalkyl)-4,7-indoloquinone derivative. Treatment of a 3-(α-hydroxyalkyl)-4,7-indoloquinone with a lower alkyl chloroformate or phenyl chloroformate gives rise to the corresponding 3-(α-alkoxycarbonyloxyalkyl)- or 3-(α-phenoxycarbonyloxyalkyl)-4,7-indoloquinone derivative. The phenyl carbonate esters are particularly useful for the preparation of certain of the 3-(α-carbamoyloxyalkyl)-4,7-indoloquinones. Thus, upon treatment of the phenyl carbonate esters with a lower alkyl amine there is obtained the corresponding 3-(α-alkylcarbamoyloxyalkyl)-5-alkylamino-4,7-indoloquinone, while treatment with ammonia or a di(lower alkyl)amine is productive of the 3-(α-carbamoyloxyalkyl)- or 3-(α-dialkylcarbamoyloxyalkyl)-4,7-indoloquinone derivatives. Moreover, other 3-(α-carbamoyloxyalkyl)-4,7-indoloquinones may be prepared by the treatment of a 3-(α-hydroxyalkyl)-4,7-indoloquinone with a lower alkyl, lower alkenyl, or aryl isocyanate, or with a diphenyl carbamoyl chloride.

The novel 3-formyl- and 3-lower alkanoyl-4,7-indoloquinones of the present invention may be prepared in several ways, principally in accordance with the following reaction schemes; which also demonstrate their conversion to the corresponding 3-(α-hydroxyalkyl)-4,7-indoloquinones:

FLOWSHEET A

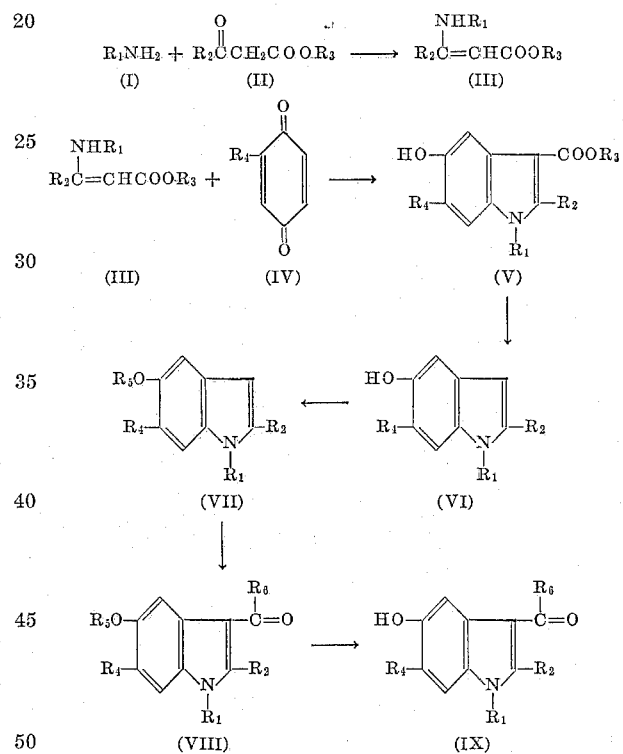

wherein $R_2$, $R_3$, $R_4$ and $R_5$ are lower alkyl and $R_1$ and $R_6$ are hydrogen or lower alkyl. In accordance with this reaction scheme, the indole system (V) is developed by condensation of a substituted 1,4-benzoquinone (IV) with a substituted amino-crotonate ester (III). The latter reagent is prepared by the interaction of an appropriate amine (I) with a β-ketoester (II). The resulting 5-hydroxy-3-indolecarboxylic ester (V) may be converted into other useful 5-hydroxyindoles (IX). Thus, decarbalkoxylation of the 3-indolecarboxylic ester (V) gives the hydroxyindoles (VI); a particularly useful reagent for this transformation being hydrochloric acid. The resulting 5-hydroxyindole (VI) is then O-alkylated to furnish the 5-alkoxyindole (VII). Treatment of this product with phosphorus oxychloride and dimethylformamide or with an alkanoyl anhydride and alkali metal alkanoate affords the corresponding 3-carboxaldehyde or 3-acyl derivative (VIII). The ether function in this class of compounds is then cleaved to give the important 5-hydroxyindoles (IX); this cleavage may be effected with hydriodic acid or aluminum chloride in boiling xylene.

As set forth in the following reaction scheme:

FLOWSHEET B

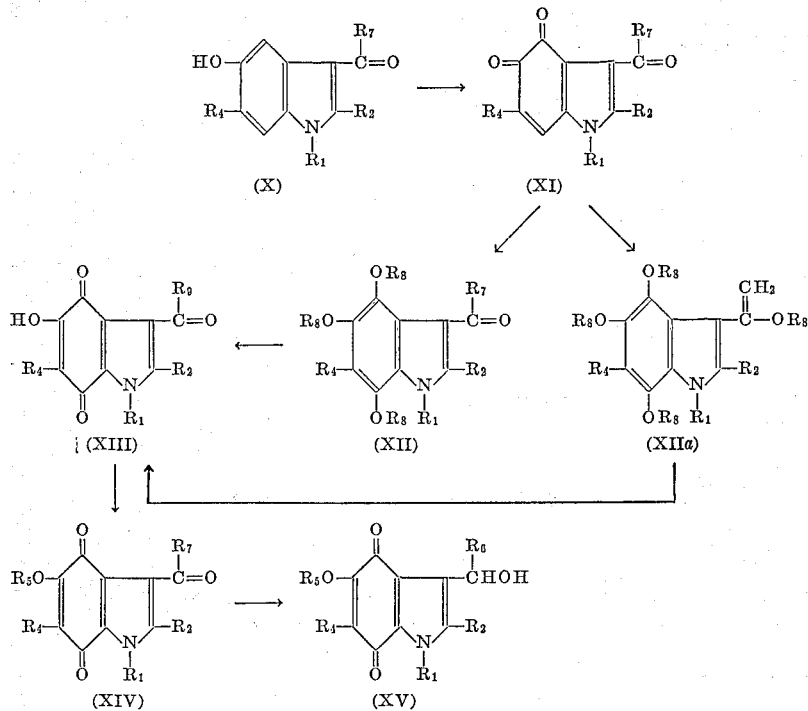

wherein $R_1$, $R_2$, $R_4$ and $R_5$ are lower alkyl; $R_7$ is hydrogen, lower alkyl or lower alkoxy; $R_8$ is lower alkanoyl and $R_9$ is hydrogen, hydroxy or lower alkyl; the previously described 5-hydroxyindoles (X) may be converted into 4,5-ortho-quinones (XI) by any of several methods well known to the art for the conversion of a phenol into an ortho-quinone. Particularly useful for this transformation is potassium nitrosodisulfonate (Fremy's salt) which accomplishes this conversion in one step. Conversion of an ortho-quinone (XI) into the para-quinone (XIII) is achieved via an intermediate 4,5,7-lower alkanoyloxy-indole (XII), prepared by treating the ortho-quinone with a lower alkanoyl anhydride and a strong acid such as boron trifluoride. When the ortho-quinone (XI) contains a 3-acyl substituent, concomitant enol acylation of the carbonyl group occurs to give (XIIa). The triacyl-oxyindoles (XII and XIIa) then may be hydrolyzed to the corresponding trihydricphenols, which on oxidation with air or other oxidizing agents, furnish the corresponding 5-hydroxy-para-quinone (XIII). During the hydrolysis step, a 3-carbalkoxy group is hydrolyzed to the corresponding acid, and the enol acylate (XIIa) formed in the acylation of an ortho-quinone containing a 3-acyl substituent is hydrolyzed to regenerate the 3-acyl substituent. The 5-hydroxy-para-quinones (XIII) may be O-alkylated to give the corresponding 5-alkoxy-para-quinones; of particular value for this conversion are the dialkyl sulfates and tetraalkoxymethanes. The alkylation of a 5-hydroxy-para-quinone containing a 3-carboxy substituent produces the 3-carbalkoxy-5-alkoxy-para-quinone. Reduction of the 5-alkoxy-para-quinones (XIV), followed by oxidation of the hydroquinone thus formed, gives the important 3-($\alpha$-hydroxyalkyl)-para-quinones (XV). When the 5-alkoxy-para-quinones (XIV) have a carbalkoxy substituent in the 3-position, lithium aluminum hydride is used for this reduction. For those 5-alkoxy-para-quinones (XIV) having a formyl or acyl substituent at the 3-position, sodium borohydride is particularly useful for this reduction.

The novel compounds of the present invention may also be prepared as set forth in the following reaction scheme:

FLOWSHEET C

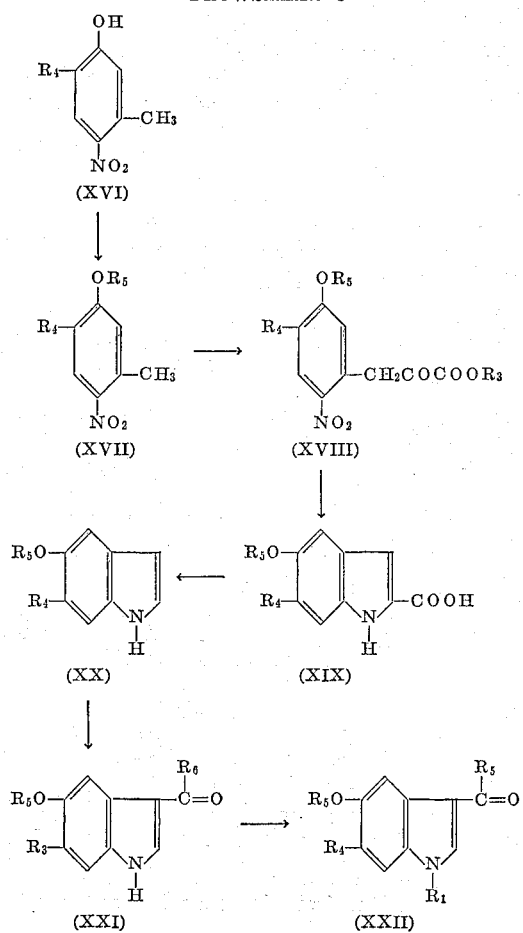

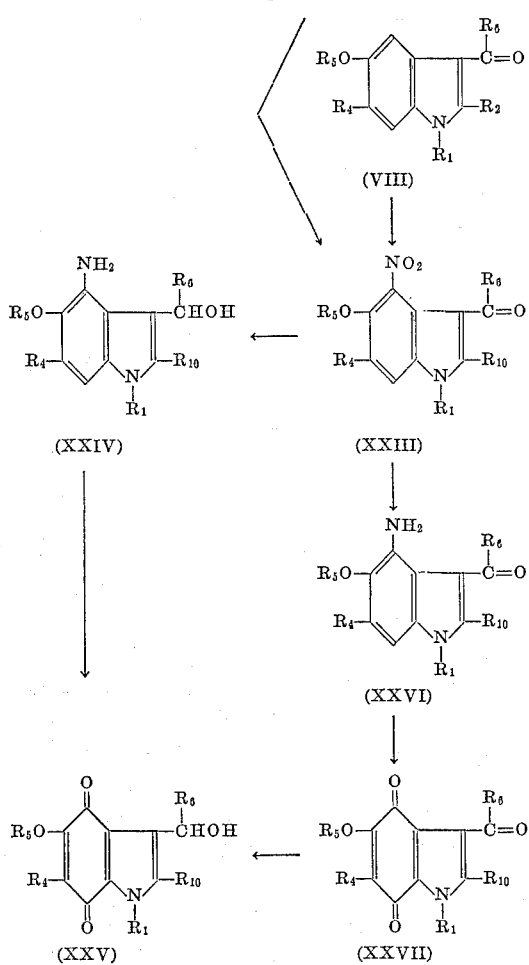

droxyalkyl)-4,7-indoloquinones bearing hydrogen at the 2-position, i.e. compounds such as (XXV) wherein $R_{10}$ is hydrogen. In accordance with this reaction scheme an ortho-alkyl-para-nitro-meta-cresol (XVI) is treated with an alkylating agent such as an alkyl halide or dialkyl sulfate in the presence of base to give the alkyl aryl ether (XVII). Base-catalyzed acylation of (XVII) with a dialkyl oxalate affords the glyoxylic ester (XVIII). Reductive cyclization of this ester furnishes a 6-alkyl-5-alkoxy-2-indolecarboxylic acid (XIX); this reductive cyclization may be achieved with zinc dust in acetic acid, ferrous ammonium sulfate, sodium hydrosulfite or the like. Decarboxylation of the acid (XIX) then gives the indole (XX) which on treatment with phosphorous oxychloride and dimethylformamide or a dimethylalkanoylamide furnishes the 3-formyl- or 3-acylindole (XXI). On treatment with a strong base such as potassium hydroxide or sodium hydride and an alkylating agent such as an alkyl halide or a dialkyl sulfate, the 3-formyl and 3-acylindoles (XXI) afford the corresponding 1-alkyl derivatives (XXII). These compounds (VIII and XXII) are converted into their 4-nitro derivatives (XXIII) by the action of an alkali metal nitrate in sulfuric acid or fuming nitric acid in acetic acid. On hydrogenation in the presence of a noble metal catalyst the 4-nitroindoles (XXIII) are transformed into the 4-amino-3-(α-hydroxyalkyl)indoles (XXIV), which on treatment with an oxidizing agent such as Fremy's salt give the requisite 3-(α-hydroxyalkyl)-4,7-indoloquinones (XXV).

Alternatively, the 4-nitroindoles (XXIII) may be treated with a chemical reducing agent, e.g., ferrous ammonium sulfate or iron in acetic acid, to give the corresponding 4-aminoindoles (XXVI). On treatment with Fremy's salt these last compounds furnish the corresponding para-quinones (XXVII). Reduction of the 3-formyl or 3-acyl substituents in these compounds with sodium borohydride and oxidation of the intermediate hydroquinone with acidic ferric chloride gives the 3-(α-hydroxyalkyl)-4,7-indoloquinones (XXV).

wherein $R_2$, $R_3$, $R_4$ and $R_5$ are lower alkyl; and $R_1$, $R_6$ and $R_{10}$ are hydrogen or lower alkyl. This sequence is of particular value for the preparation of those 3-(α-hy- Certain of the novel compounds of the present invention may also be obtained in accordance with the following reaction scheme:

FLOWSHEET D

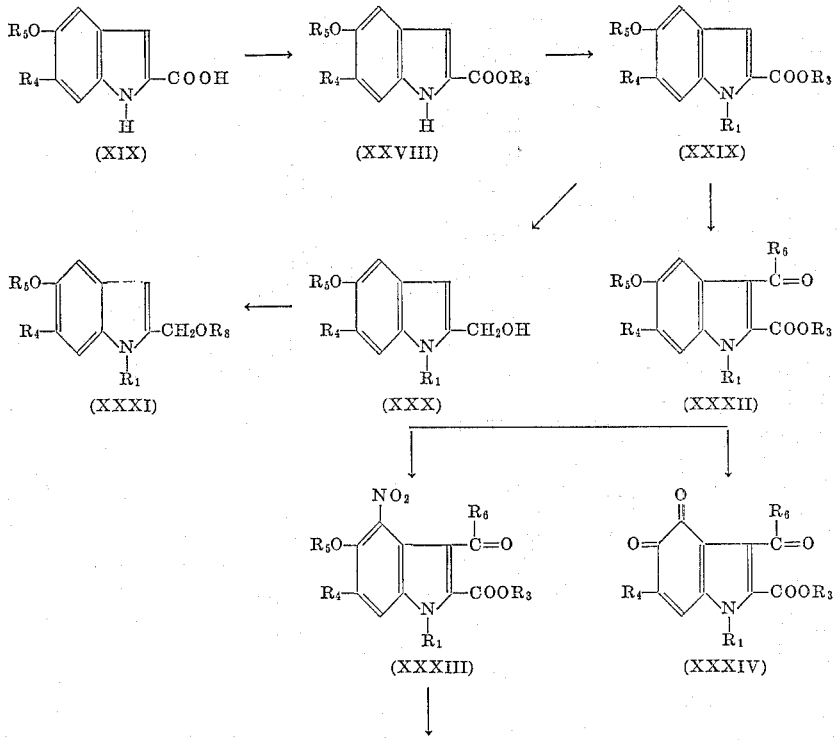

FLOWSHEET D—Continued

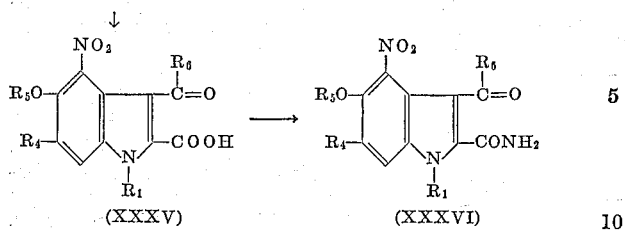

wherein $R_1$ and $R_6$ are hydrogen or lower alkyl; $R_3$, $R_4$ and $R_5$ are lower alkyl; and $R_8$ is lower alkanoyl. In accordance with this flowsheet, esterification of the acids of type XIX (Flowsheet C) gives the corresponding ester (XXVIII). Upon treatment with an organic base and a lower alkyl sulfate these esters are converted into the corresponding N-alkyl compounds (XXIX). Reduction of the latter compounds with lithium aluminum hydride gives the corresponding 2-indolylmethanols (XXX), which on treatment with a lower alkanoic acid anhydride in pyridine are transformed into compounds of type XXXI. These last compounds may be converted into the important 3-($\alpha$-hydroxyalkyl)-4,7-indoloquinones as described in Flowesheets A and C. In this conversion, the 4-nitroindole (corresponding to XXIII) undergoes concomittant deacylation upon reduction to the 4-aminoindole (corresponding to XXVI). After oxidation of this substance to the para-quinone (corresponding to XXVII) the hydroxymethyl substituent in converted into a 2-tetrahydropyranyloxymethyl derivative by reaction with dihydropyran in the presence of an acid catalyst. Sodium borohydride reduction followed by ferric chloride oxidation then gives a 3-($\alpha$-hydroxyalkyl)-4,7-indoloquinone having a 2-tetrahydropyranyloxymethyl substituent.

Alternatively, the indole esters (XXIX) of Flowsheet D may be converted into their 3-formyl or 3-acyl derivatives (XXXII) by phosphorus oxychloride and dimethylformamide or dimethylalkanoyl amide. Upon treatment with fuming nitric acid in glacial acetic acid the compounds of the type XXXII give the 4-nitroindoles (XXXIII) in mixture with the 4,5-indoloquinones (XXXIV). These last compounds may be transformed into 3-($\alpha$-hydroxyalkyl)-4,7-indoloquinones having a 2-carboalkoxy substituent in accordance with procedures outlined in Flowsheet B. The 4-nitroindoles (XXXIII) may also be converted into 3-($\alpha$-hydroxyalkyl)-4,7-indoloquinones containing a 2-carboalkoxy substituent as illustrated in Flowsheet C. Additionally, the 4-nitroindoles (XXXIII) are hydrolyzed by methanolic solutions of inorganic bases to give the 4-nitroindole acids (XXXV), which are converted into the amides (XXXVI). The latter conversion is best effected by conversion of the acids (XXXV) into a mixed carbonic acid anhydride, which on treatment with ammonia gives the amides (XXXVI). These compounds are then transformed into 3-($\alpha$-hydroxyalkyl)-4,7-indoloquinones having a 2-carboxamido substituent as illustrated in Flowsheet C.

Certain of the requiste 3-($\alpha$-ketoalkyl)-4,7-indoloquinones may be obtained in accordance with the following reaction scheme:

FLOWSHEET E

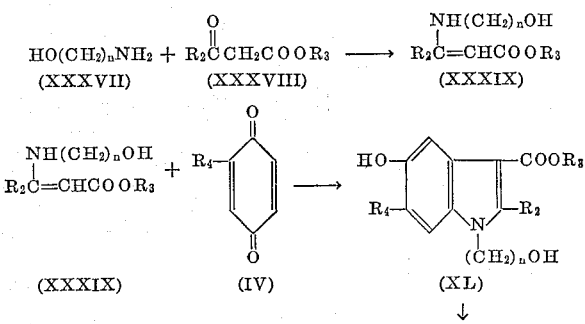

FLOWSHEET E—Continued

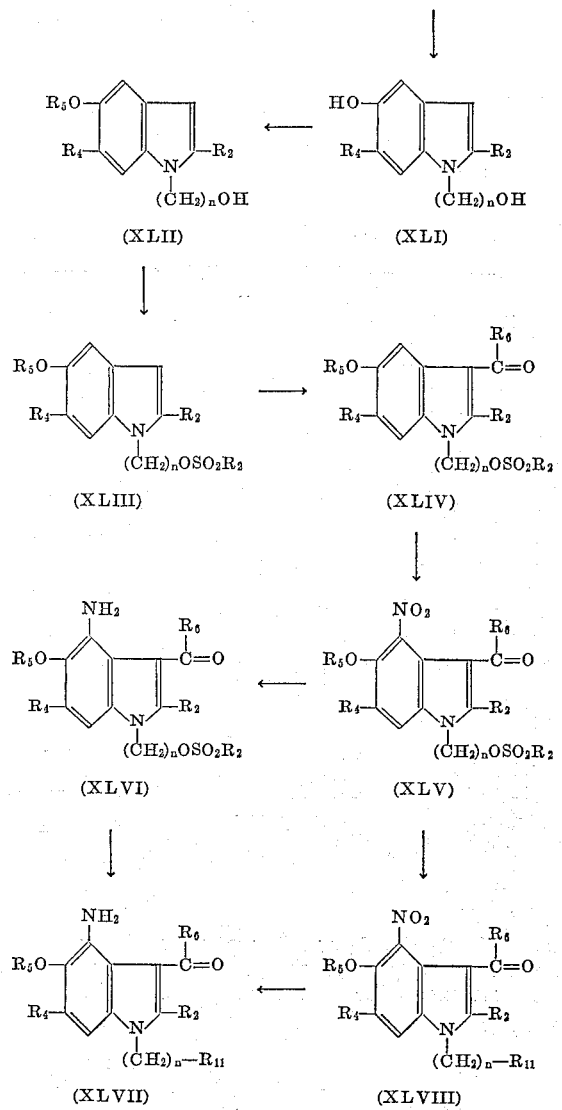

wherein $R_2$, $R_3$, $R_4$ and $R_5$ are lower alkyl; $R_6$ is hydrogen or lower alkyl; $R_{11}$ is halogen, azido, lower alkylmercapto, thiocyano, lower alkanoyloxy, and hydroxy; and $n$ is an integer greater than 1. As illustrated in this flowsheet, use of an $\omega$-hydroxyalkylamine in the processes described in Flowsheets A and C gives the important 4-aminoindoles (XLVI) and 4-nitroindoles (XLV). These compounds are then converted into the $\omega$-substituted alkyl indoles (XLVII) and (XLVIII) on treatment with an inorganic halide, azide, lower alkylmercaptide, thiocyanate or lower alkanoate in an inert solvent such as acetone or dimethylformamide. The resulting 4-nitroindoles (XLVIII) are then reduced to give the 4-aminoindoles (XLVII). When the latter compound contains a 1-($\omega$-lower alkanoyloxy) alkyl substituent, it is treated with an inorganic base to give a 4-aminoindole (XLVII) having a 1-($\omega$-hydroxyalkyl) substituent. On reaction with dihydropyran in the presence of acid these compounds give 4-aminoindoles (XLVII) having a 1-($\omega$-tetrahydropyranyloxy)alkyl substitutent. The resulting 4-aminoindoles (XLVII) are then converted into 3-($\alpha$-hydroxyalkyl) - 4,7 - indoloquinones having 1-($\omega$-substituted alkyl) groups in the manner illustrated in Flowsheet C.

Certain of the novel compounds of the present invention may also be obtained in accordance with the following reaction scheme:

FLOWSHEET F

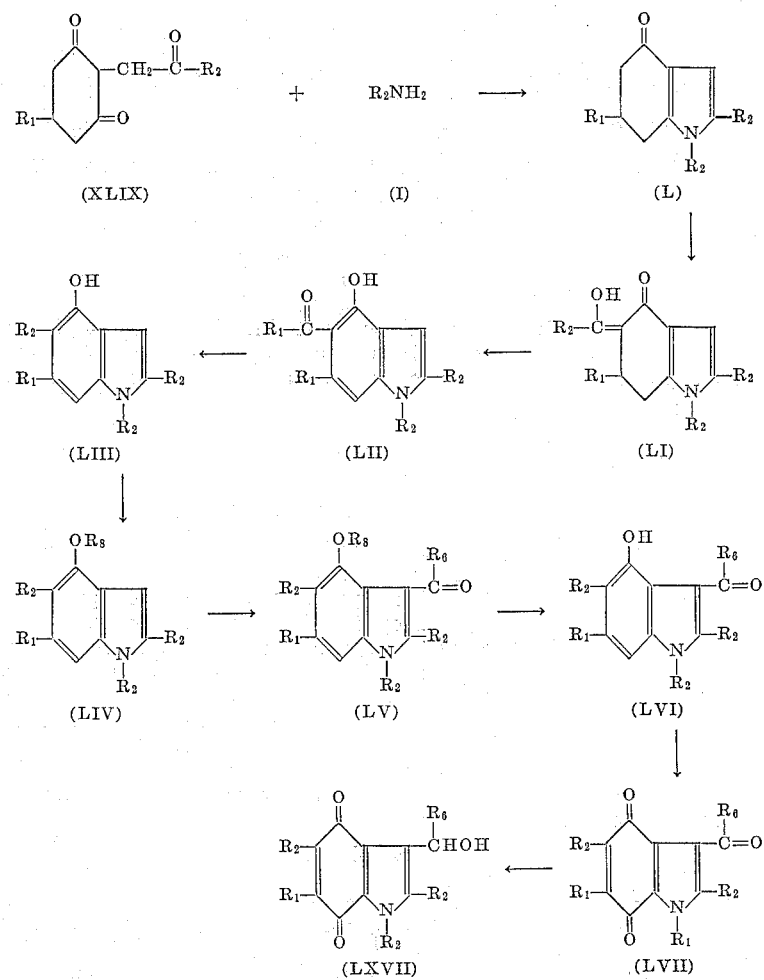

wherein $R_1$ and $R_6$ are hydrogen or lower alkyl, $R_2$ is lower alkyl and $R_3$ is lower alkanoyl. Thus, reaction of an appropriate alkylamine (I) with a triketone of type (XLIX) is productive of a 4-oxo-4,5,6,7-tetrahydroindole (L). Base-catalyzed acylation of the 4-oxotetrahydroindole (L) furnishes the corresponding 5-formyl or 5-acyl-4-oxotetrahydroindole (LI), shown in Flowsheet F in one of the two possible enolic forms. Dehydrogenation of (LI), preferably on treatment with 2,3-dichloro-5,6-dicyanobenzoquinone, affords the 5-acyl-4-hydroindoles (LII), catalytic hydrogenation of which, preferably in the presence of palladium-on-carbon catalyst, then furnishes the 5 - alkyl - 4 - hydroxyindole (LIII). After esterifying (for example, with acetic anhydride) the 4-hydroxy group in (LIII) to give (LIV), the 3-formyl or a 3-acyl group can be introduced. For example, on treatment of (LIV) with phosphorous oxychloride and dimethylformamide the 3-formyl derivative is obtained. The 3-formyl- or 3-acyl-4-alkanoyloxyindoles (LV) can be converted to the corresponding 4-ols (LVI) on base treatment and the latter compounds may be oxidized to the para-quinone (LVII), preferably by treatment with potassium dinitrosodisulfonate. The quinone aldehydes (LVII) then may be converted to the 5-alkyl-3-(α-hydroxyalkyl)indoloquinones (LXVII) on reduction with a metal hydride, preferably sodium borohydride, and reoxidation of the intermediate hydroquinone, preferably with acidic ferric chloride.

Certain of the novel compounds of the present invention may also be obtained in accordance with the following reaction scheme:

FLOWSHEET G

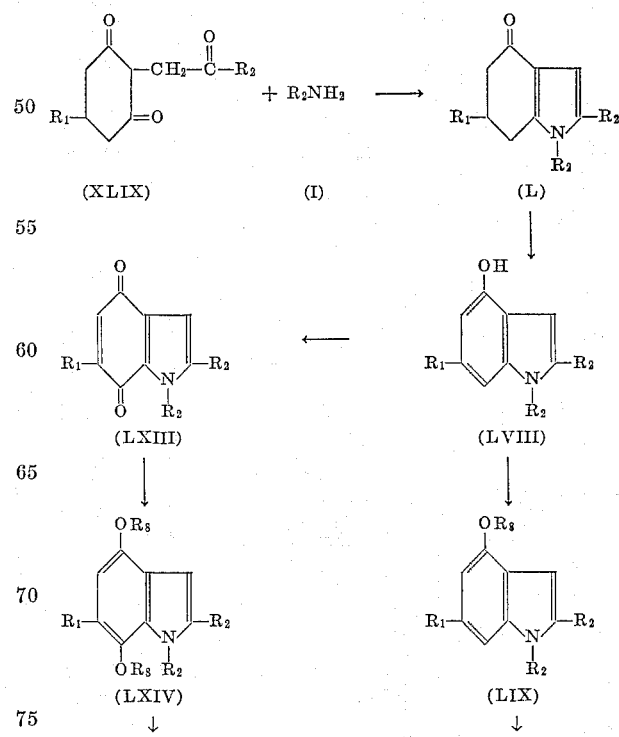

FLOWSHEET G—Continued

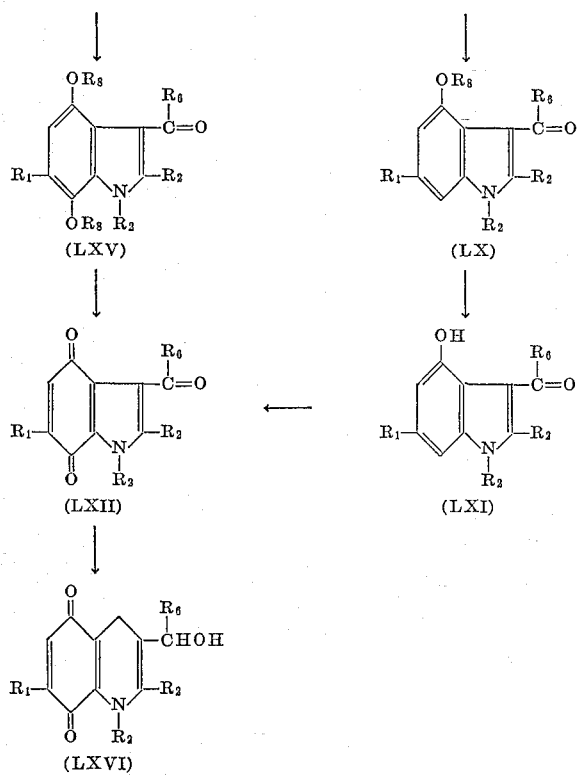

wherein $R_1$ and $R_6$ are hydrogen or lower alkyl, $R_2$ is lower alkyl and $R_8$ is lower alkanoyl. Treatment of the 4-oxotetrahydroxyindoles (L) with a dehydrogenating agent such as palladium in boiling cumene furnish the 4-hydroxyindoles (LVIII), which are converted into the 4-acyloxyindoles (LIX) on treatment with an alkanoyl anhydride. These acyloxyindoles (LIX) may then be converted into their 3-formyl or 3-acyl derivatives (LX) by any of several methods known to those skilled in the art. For example, on reaction with phosphorus oxychloride and dimethylformamide the 3-formyl derivative is obtained. After removal of the O-acyl group by treatment with base, the resulting 4-hydroxy-3-formyl or 3-acylindoles (LXI) may be treated with an oxidizing agent, for example, Fremy's salt, to give the corresponding 3-substituted-4,7-indoloquinones (LXII). In the manner described previously, treatment of the 3-acyl-4,7-indoloquinones (LXII) with a reducing agent such as sodium borohydride followed by oxidation of the intermediate hydroquinone with a reagent such as ferric chloride, produces the 3-($\alpha$-hydroxyalkyl)-4,7-indoloquinone (LXVI).

The 3-formyl or 3-acyl indoloquinones (LXII) may also be prepared from the 4-hydroxyindole (LVIII) by an alternate pathway as follows. Oxidation of (LVIII) with Fremy's salt affords the para-quinone (LXIII) which on reductive alkanoylation, for example on treatment with zinc, acetic anhydride and pyridine, gives the 4,7-bis-alkanoyloxy derivative (LXIV). As described previously, the latter compounds (LXIV) may be converted to the 3-formyl or 3-acyl derivatives (LXV), which on basic hydrolysis (to the intermediate 4,7-diol corresponding to (LXV) and oxidation, for example, with acidic ferric chloride), gives the aforementioned 3-acyl or 3-formyl indoloquinones (LXII).

Certain of the novel compounds of the present invention may also be obtained in accordance with the reaction scheme of Flowsheet H.

FLOWSHEET H

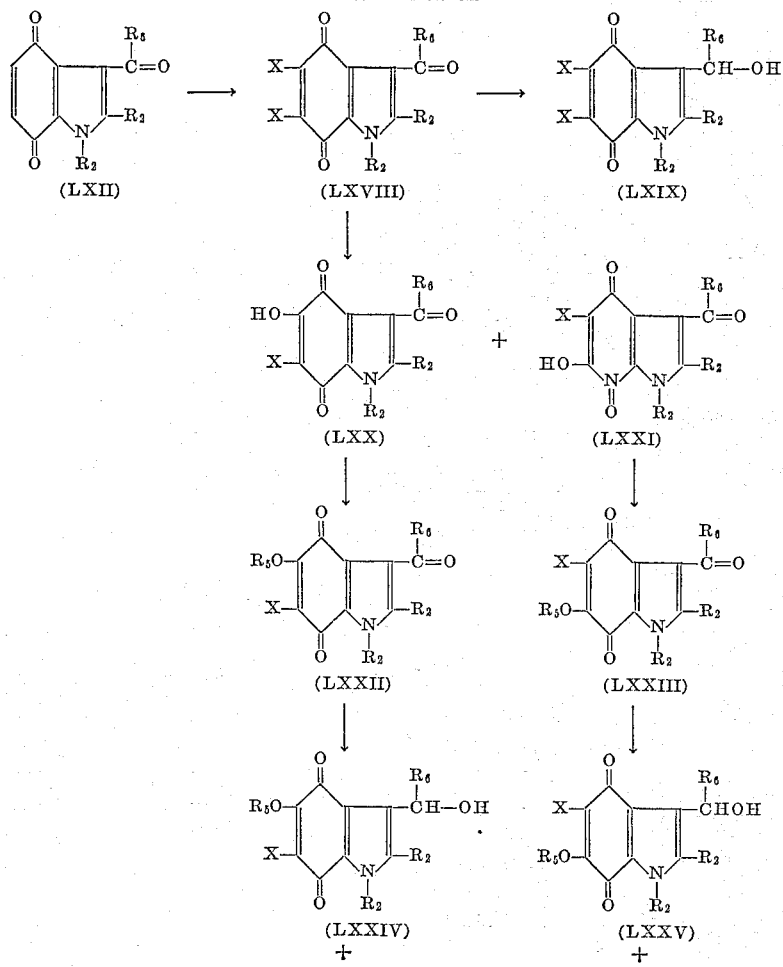

FLOWSHEET H—Continued

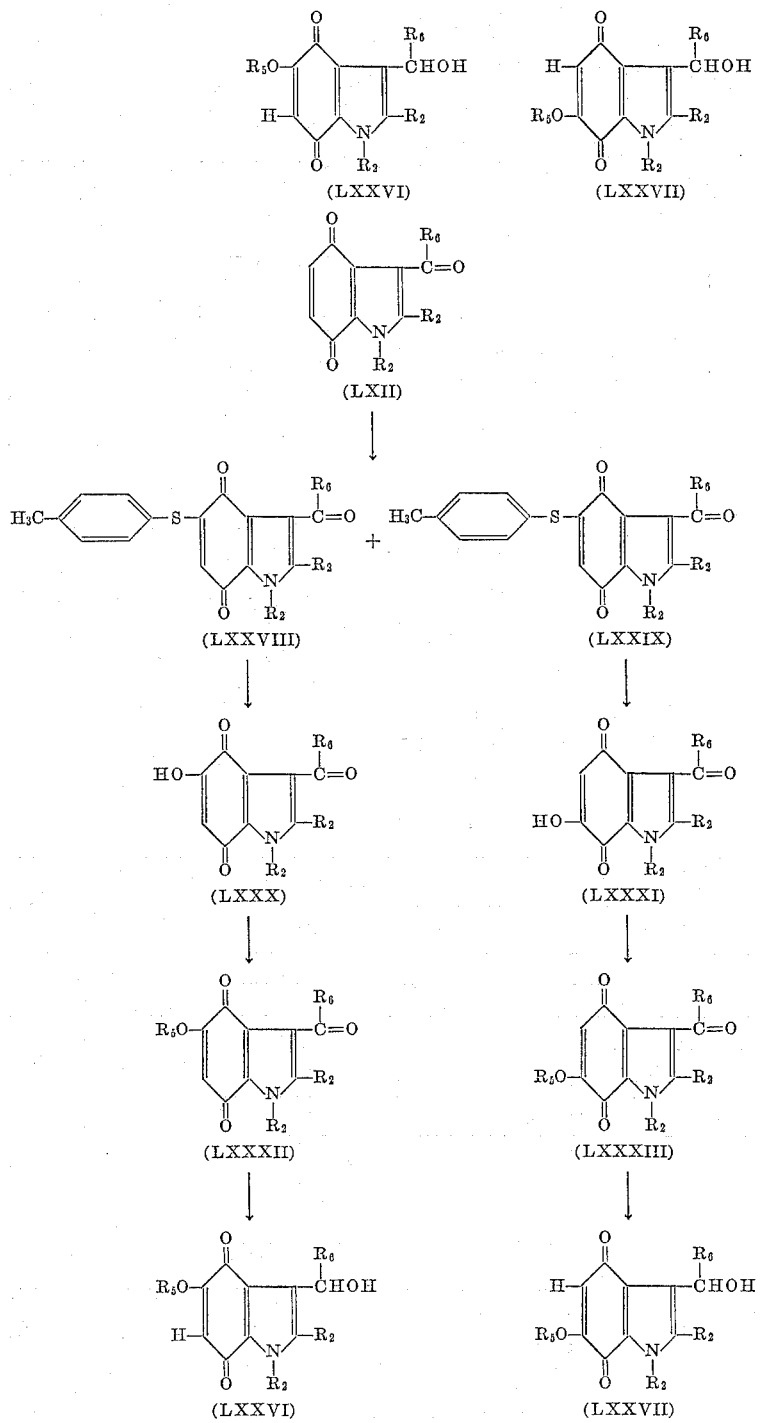

wherein $R_2$ and $R_5$ are lower alkyl, $R_6$ is hydrogen or lower alkyl and X is halogen.

Thus, treatment of the 3-formyl or 3-acyl 4,7-indoloquinone, unsubstituted at positions 5 and 6, (LXII), with halogen, preferably bromine or chlorine, gives the 5,6-dihaloquinone (LXVIII), which, in the aforesaid manner, on reduction and reoxidation of the intermediate hydroquinone furnishes the 5,6-dihalo-3-($\alpha$-hydroxyalkyl)-4,7-indoloquinones (LXIX). Further, treatment of the dihaloquinone intermediate (LXVIII) with base, e.g. sodium hydroxide, affords both the 5 - hydroxy - 6 - haloquinone (LXX) and the 6 - hydroxy - 5 - haloquinone (LXXI). Treatment of (LXX) and (LXXI) with an alkylating agent gives the corresponding alkoxy-haloquinones (LXXII) and (LXXIII). Subsequent treatment of (LXXII) and (LXXIII) in the aforesaid manner with sodium borohydride and reoxidation of the intermediate hydroquinone with acidic ferric chloride furnishes the corresponding 5/6-alkoxy-5/6-halo-3-($\alpha$-hydroxyalkyl)-4,7-quinones (LXXIV) and (LXXV), respectively as well as the 6-unsubstituted-5-alkoxyindoloquinone carbinol (LXXVI) and the 5-unsaturated-6-alkoxy-indoloquinone carbinol (LXXVII), respectively.

The 5- or 6-unsubstituted indoloquinones (LXXVI) and (LXXVII) may be obtained in an alternative manner as follows. Treatment of the 5,6-unsubstitutedindoloquinone (LXII) with a mercaptan such as p-toluenethiol furnishes the 5-toluenethioquinone (LXXVIII) as well as the 6-toluenethioquinone (LXXIX). Caustic hydrolysis of these derivatives gives the corresponding hydroxyquinones (LXXX) and (LXXXI), respectively. O-alkylation of the latter quinones furnishes the 5- and 6-alkoxyquinones (LXXXII) and (LXXXIII), respectively and treatment of these compounds in the aforesaid manner with sodium borohydride and reoxidation of the intermediate hydroquinones with acidic ferric chloride produces (LXXVI) and (LXXVII), respectively.

Certain of the novel compounds of the present invention may be obtained in accordance with the reaction scheme of Flowsheet I which follows:

FLOWSHEET I

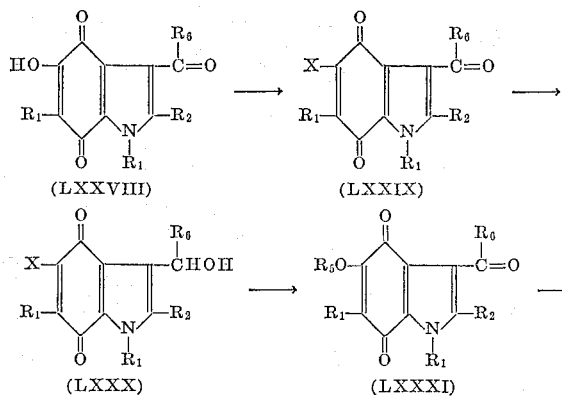

Treatment of 3-acyl- or 3-formyl-5-alkoxy-4,7-indoloquinones (LXXXI) with an alkyl mercaptan in the presence of an acidic catalyst, e.g., hydrochloric acid, affords the 5-alkylthioquinones (LXXXII), which, as previously described, may be converted to the requisite 5-alkylthio-3-($\alpha$-hydroxyalkyl) - 4,7-indoloquinones (LXXXIII) by reduction and subsequent reoxidation of the intermediate hydroquinone.

The invention will be described in greater detail in conjunction with the following specific examples.

*Example 1*

*Preparation of ethyl $\beta$-ethylaminocrotonate.*—With mechanical stirring a stream of ethylamine is introduced into 98.5 g. (100 ml.) of ethyl acetoacetate for 3 hours. During the first hour cooling is required to hold the temperature at 35–40° C. where it is maintained throughout the reaction. Ether (200 ml.) is added, and the water is separated. The ether is removed from the organic phase and the residue is distilled under reduced pressure to give a water white liquid, B.P. 20 mm. 116–118° C., $n_D^{25}$ 1.4941, 104 g.

*Examples 2–6*

By the procedure described in Example 1 the compounds of Table I are obtained.

TABLE I

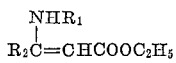
$R_2C=CHCOOC_2H_5$ with NHR$_1$

| Example No. | Starting Materials | | Product | | B.P., ° C. (pressure) |
| --- | --- | --- | --- | --- | --- |
| | Ester | Amine | R$_1$ | R$_2$ | |
| 2 | Ethyl acetoacetate | Propyl amine | C$_3$H$_7$ | CH$_3$ | 119–119.5 (14 mm.). |
| 3 | do | i-Propyl amine | (CH$_3$)$_2$CH | CH$_3$ | 106–106.5 (11 mm.). |
| 4 | do | Butyl amine | C$_4$H$_9$ | CH$_3$ | 129.5–131.0 (14 mm.). |
| 5 | do | Ethanolamine | CH$_2$CH$_2$OH | CH$_3$ | Decomposes. |
| 6 | Ethyl propionylacetate | Ethyl amine | C$_2$H$_5$ | C$_2$H$_5$ | 118–121 (14 mm). |

FLOWSHEET I—*Continued*

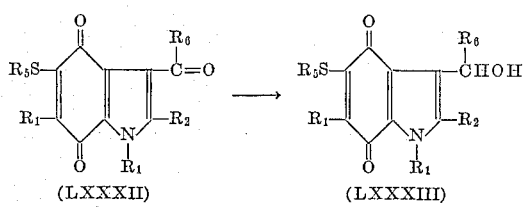

wherein R$_1$ and R$_6$ are hydrogen or lower alkyl, R$_2$ and R$_5$ are alkyl and X is halogen.

Thus, treatment of the 3-acyl- or 3-formyl-5-hydroxyindoloquinones (LXXVIII) with an appropriate halogenating agent gives the 5-haloquinones (LXXIX). For example, treatment with a solution of phosphorous oxychloride in dimethylformamide affords a 5-chloro derivative. Subsequent reduction in the aforesaid manner with sodium borohydride and reoxidation of the intermediate hydroquinones with ferric chloride furnishes the 5-halo-3-($\alpha$-hydroxyalkyl)-4,7-indoloquinones (LXXX).

*Example 7*

*Preparation of ethyl 1-ethyl-5-hydroxy-2,6-dimethyl-3-indolecarboxylate.*—A solution of 122 g. (0.0855 mole) of ethyl $\beta$-ethylaminocrotonate (Example 1) in 60 ml. of acetone is thoroughly swept with nitrogen and treated with 10.9 g. (0.895 mole) of toluquinone. The deep red solution is heated on the steam-bath for 2 hours, cooled in an ice-bath and filtered to give a dark solid. This material is washed with cold acetone and dried to give 4.45 g. of gray crystals. The combined filtrate and washings are concentrated to about 50 ml. volume and placed in the refrigerator for 16 hours. The solid is collected by filtration and washed with boiling light petroleum to give an additional 3.90 g. of crystals. A sample is recrystallized from dilute ethanol containing a trace of sodium hydrosulfite to give off-white crystals, M.P. 196–198° C.

*Examples 8–14*

In the manner described in Example 7 the compounds of Table II are prepared.

TABLE II

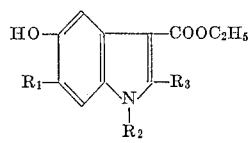

| Example No. | Starting Materials | | Product | | | M.P.,[a] °C. |
|---|---|---|---|---|---|---|
| | | | $R_1$ | $R_2$ | $R_3$ | |
| 8 | Ethyl β-methylaminocrotonate[b] | Toluquinone | $CH_3$ | $CH_3$ | $CH_3$ | 222–225 |
| 9 | Product of Example 2 | do | $CH_3$ | $C_3H_7$ | $CH_3$ | 193.5–195.0 |
| 10 | Product of Example 3 | do | $CH_3$ | $(CH_3)_2CH$ | $CH_3$ | 202–203 |
| 11 | Product of Example 4 | do | $CH_3$ | $C_4H_9$ | $CH_3$ | 176–177 |
| 12 | Product of Example 5 | do | $CH_3$ | $CH_2CH_2OH$ | $CH_3$ | 196.0–197.5 |
| 13 | Product of Example 6 | do | $CH_3$ | $C_2H_5$ | $C_2H_5$ | 164–166 |
| 14 | Product of Example 1 | Ethylbenzoquinone[c] | $C_2H_5$ | $C_2H_5$ | $CH_3$ | 207–203 |

[a] All products are recrystallized from acetone-hexane.
[b] S. A. Glickman and A. C. Cope, J. Am. Chem. Soc. 67, 1019 (1945).
[c] Clemmensen, Ber., 47, 56 (1914).

Example 15

*Preparation of 1-ethyl-5-hydroxy-2,6-dimethylindole.*— A mechanically stirred mixture of 50.0 g. of ethyl 1-ethyl-5-hydroxy-2,6-dimethyl-3-indolecarboxylate (Example 7) and 500 ml. of 20% hydrochloric acid solution is heated at reflux temperature for 2 hours. The acid solution is diluted with 500 ml. of water, saturated with sodium chloride and extracted well with ethyl acetate. The extracts are dried over magnesium sulfate and evaporated. The residue crystallizes from methylene chloride-petroleum ether (B.P. 30–60°) to give 26.0 g. of crystals, M.P. 113–117° C. An additional 4.8 g. of crystals is obtained by concentration of the mother liquor. This material also has a crystalline modification that melts at 90–92° C. Both forms have identical infrared spectra in carbon tetrachloride solution.

Examples 16–22

In the manner described in Example 15 the compounds of Table III are obtained.

Example 23

*Preparation of 1-ethyl-5-methoxy-2,6-dimethylindole.*— To a magnetically stirred solution of 49.1 g. of 1-ethyl-5-hydroxy-2,6-dimethylindole (Example 15) in 300 ml. of ethyl alcohol and 600 ml. of 2 N sodium hydroxide solution is added dropwise over 90 min. at reflux temperature under nitrogen 100 g. (74 ml.) of methyl sulfate. The resulting mixture is heated at reflux temperature for an additional 60 minutes and then extracted with ethyl acetate. The extract is washed with saline, dried over magnesium sulfate and evaporated. The residual brown oil is dissolved in benzene and passed through a magnesia-silica gel column (1.0 x 12.5 in.), benzene being used as the eluting solvent and 250 ml. fractions being collected. Fraction 1 contains 46.9 g. of amber oil and fraction 2 contains 1.0 g. These fractions crystallize on standing. A sample of this material is recrystallized from hexane to give white crystals, M.P. 56–57° C.

Examples 24–31

By the procedure given in Example 23 the compounds of Table IV are obtained.

TABLE III

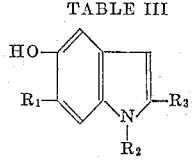

| Example No. | Starting Material | Product | | | M.P.,[a] °C. |
|---|---|---|---|---|---|
| | | $R_1$ | $R_2$ | $R_3$ | |
| 16 | Product of Example 8 | $CH_3$ | $CH_3$ | $CH_3$ | 130.0–131.5 |
| 17 | Product of Example 9 | $CH_3$ | $C_3H_7$ | $CH_3$ | 125–128 |
| 18 | Product of Example 10 | $CH_3$ | $(CH_3)_2CH$ | $CH_3$ | 94–95 |
| 19 | Product of Example 11 | $CH_3$ | $C_4H_9$ | $CH_3$ | 73.5–75.0 |
| 20 | Product of Example 12 | $CH_3$ | $CH_2CH_2OH$ | $CH_3$ | 121–123 |
| 21 | Product of Example 13 | $CH_3$ | $C_2H_5$ | $C_2H_5$ | 88–90 |
| 22 | Product of Example 14 | $C_2H_5$ | $C_2H_5$ | $CH_3$ | 80.5–81.5 |

[a] All products are recrystallized from methylene chloride-petroleum ether (B.P. 30–60° C.).

TABLE IV

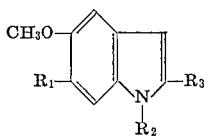

| Example No. | Starting Material | Product | | | State |
|---|---|---|---|---|---|
| | | R₁ | R₂ | R₃ | |
| 24 | 5-hydroxy-2,6-dimethylindole a | CH₃ | H | CH₃ | Solid, M.P. 94–96° C. |
| 25 | Product of Example 16 | CH₃ | CH₃ | CH₃ | Solid, M.P. 75–77° C. |
| 26 | Product of Example 17 | CH₃ | C₃H₇ | CH₃ | Oil. |
| 27 | Product of Example 18 | CH₃ | (CH₃)₂CH | CH₃ | Oil. |
| 28 | Product of Example 19 | CH₃ | C₄H₉ | CH₃ | Oil. |
| 29 | Product of Example 20 | CH₃ | CH₂CH₂OH | CH₃ | Solid, M.P. 78–80° C. |
| 30 | Product of Example 21 | CH₃ | C₂H₅ | C₂H₅ | Oil. |
| 31 | Product of Example 22 | C₂H₅ | C₂H₅ | CH₃ | Oil. | a R.J.S. Beer, et al., J. Chem. Soc., 2029 (1951).

*Example 32*

*Preparation of 1-(β-methanesulfonyloxyethyl)-5-methoxy-2,6-dimethylindole.*—To an ice-chilled magnetically stirred solution of 12.7 g. of 1-(β-hydroxyethyl)-5-methoxy-2,6-dimethylindole (Example 20) in 100 ml. of pyridine is added dropwise 10 ml. of methanesulfonyl chloride. The resulting solution is kept at 0–5° C. for 15 hours; water is then added, and the mixture is extracted with methylene chloride. The combined extracts are washed with saline, dried over magnesium sulfate and evaporated. The residue is recrystallized from methylene chloride-petroleum ether (B.P. 30–60°) to give crystals, M.P. 118–120° C. dec.

*Example 33*

*Preparation of 2,5-dimethyl-4-nitroanisole.*—A well stirred suspension of 16.7 g. (0.1 mole) of 2,5-dimethyl-4-nitrophenol (R. L. Datta and P. S. Varma, J. Am. Chem. Soc., 41, 2042 (1919)) in 50 ml. of water at 40–45° C. is treated alternately and in portions with a solution of 7.0 g. of sodium hydroxide in 18 ml. of water and 12 ml. of methyl sulfate. After 2 hours the mixture is filtered, and the solid is recrystallized from dilute methanol to give 14.5 g. (80% yield) of needles, M.P. 90–92° C.

*Example 34*

*Preparation of 5-methoxy-4-methyl-2-nitrophenylpyruvic acid.*—Ethanol (6.25 ml.) is added to a mechanically stirred slurry of 2.15 g. (0.055 g.-atoms) of potassium in benzene. After all of the potassium reacts, the solvents are removed by distillation, benzene (50 ml.) is added and removed in the same manner. The cooled residue is slurried in 100 ml. of ether and treated with 7.3 g. (0.05 mole, 6.75 ml.) of ethyl oxalate. To the resulting solution is added a solution of 9.05 g. (0.05 mole) of 2,5-dimethyl-4-nitro-anisole (Example 33) in 150 ml. of ether. A red solid separates immediately and the mixture is mechanically stirred at room temperature for 18 hours and then at reflux temperature for 4 hours. The mixture is filtered, and the solid is washed with ether. The residue is dissolved in water and the solution is heated on the steam-bath for 30 minutes. The solution is cooled and extracted with ether. The aqueous solution is acidified with hydrochloric acid and filtered to give 6.123 g. of crystals, M.P. 167–170° C.

*Example 35*

*Preparation of 5-methoxy-6-methyl-2-indolecarboxylic acid.*—A solution of 42.0 g. (0.166 mole) of 5-methoxy-4-methyl-2-nitrophenylpyruvic acid (Example 34) in 230 ml. of 17% ammonium hydroxide and 115 ml. of water is treated with a hot solution of 300 g. of ferrous sulfate heptahydrate in 340 ml. of water. The mixture is mechanically stirred at steam-bath temperature for 1 hour and then allowed to cool to room temperature and filtered. The residue is washed with dilute ammonium hydroxide until a test portion becomes only milky on acidification. The combined filtrate and washings are acidified with hydrochloric acid and the solid which separates is collected by filtration. The moist solid is recrystallized from dilute acetic acid to give 19.0 g. (56% yield) of light brown solid, M.P. 240–242° C. (gas evolution).

*Example 36*

*Preparation of methyl 5-methoxy-6-methyl-2-indolecarboxylate.*—A solution of 4.00 g. of 5-methoxy-6-methyl-2-indolecarboxylic acid (Example 35) in 100 ml. of methanolic hydrogen chloride is heated at reflux temperature for 16 hours. The solvent is evaporated, and the residue is recrystallized from dilute methanol to give white needles, M.P. 147–149° C.

*Example 37*

*Preparation of methyl 1-ethyl-5-methoxy-6-methyl-2-indolecarboxylate.*—To a mechanically stirred solution of 15.40 g. of methyl 5-methoxy-6-methyl-2-indolecarboxylate (Example 36) in 500 ml. of benzene is added 3.55 g. of a 50.7% suspension of sodium hydride in mineral oil. late (Example 36) in 500 ml. of benzene is added 3.55 g. Gas evolution is noted almost immediately, and a gray flocculent solid separates. The mixture is heated at reflux temperature for 45 minutes, and then 25 ml. of ethyl sulfate is added over 15 minutes. The resulting mixture is heated at reflux temperature for 4 hours and filtered while hot. The solvent is removed from the filtrate by evaporation, and the excess ethyl sulfate is removed at oil-pump pressure. The residue is agitated with 250 ml. of boiling hexane and filtered. The filtrate is concentrated to about one-half its original volume and chilled to give white needles, M.P. 101–102° C.

*Example 38*

*Preparation of 1-ethyl-2-hydroxymethyl-5-methoxy-6-methylindole.*—A magnetically stirred mixture of 7.00 g. of methyl 1-ethyl-5-methoxy-6-methyl-2-indolecarboxylate (Example 37) and 2.17 g. of lithium aluminum hydride in 470 ml. of ether is heated at reflux temperature for 2.5 hours; stirring is continued for an additional 16 hours. Ethyl acetate (60 ml.) is added cautiously, and then 60 ml. of water is added. The bulk of the ethereal phase is decanted from the aqueous phase which is then diluted with water and extracted with ethyl acetate. The combined organic solutions are washed with saline, dried over sodium sulfate and evaporated. The residue is recrystallized from ether-petroleum ether (B.P. 30–60°) to give white needles, M.P. 103–106° C.

Example 39

*Preparation of 2-acetoxymethyl-1-ethyl-5-methoxy-6-methylindole.*—A solution of 5.49 g. of 1-ethyl-2-hydroxymethyl-5-methoxy-6-methylindole (Example 38) and 7 ml. of acetic anhydride in 60 ml. of pyridine is kept at room temperature for 17 hours. The solution is diluted with water to a volume of about 400 ml. and chilled to give white needles, M.P. 96–97° C.

Example 40

*Preparation of 1-ethyl-5-methoxy-2,6-dimethyl-3-indolecarboxaldehyde.*—To 200 ml. of magnetically-stirred, ice-chilled dimethylformamide is added dropwise at such a rate that the temperature remains at 0–5° C. 55 g. (32.8 ml.) of phosphorus oxychloride. The resulting solution is treated with a solution of 66.35 g. of 1-ethyl-5-methoxy-2,6-dimethylindole (Example 23) in 150 ml. of dimethylformamide at such a rate that the temperature does not exceed 5° C. The ice bath is removed and replaced by a warm water-bath, and the mixture is stirred at 35–40° C. for 1.25 hours. Cracked ice (200 ml.) is added and the mixture is transferred to a 3–1. round-bottom flask containing about 300 g. of cracked ice, 200 ml. of water being used to aid in the transfer. A solution of 250 g. of sodium hydroxide in 650 ml. of water is added dropwise with mechanical stirring until about one-half of the solution has been added; the remainder of the solution is added rapidly. The resulting mixture is heated to the boiling point, diluted with water to a volume of about 2.5 l. and cooled. Filtration gives 70.5 g. of crystals, M.P. 134–136° C.

Examples 41–50

By the procedure given in Example 40 the compounds of Table V are obtained.

TABLE V

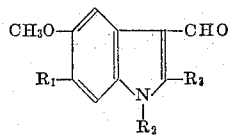

| Example No. | Starting Material | Product | | | M.P., °C. |
|---|---|---|---|---|---|
| | | R₁ | R₂ | R₃ | |
| 41 | Product of Example 24 | CH₃ | H | CH₃ | 227.0–228.5 |
| 42 | Product of Example 25 | CH₃ | CH₃ | CH₃ | 174–178 |
| 43 | Product of Example 26 | CH₃ | C₃H₇ | CH₃ | 117.5–119.5 |
| 44 | Product of Example 27 | CH₃ | (CH₃)₂CH | CH₃ | 172–174 |
| 45 | Product of Example 28 | CH₃ | C₄H₉ | CH₃ | 96–97 |
| 46 | Product of Example 30 | CH₃ | C₂H₅ | C₂H₅ | 95.5–97.0 |
| 47 | Product of Example 31 | C₂H₅ | C₂H₅ | CH₃ | 109–110 |
| 48 | Product of Example 32 | CH₃ | CH₂CH₂OSO₂CH₃ | CH₃ | 187.5–189.0 dec. |
| 49 | Product of Example 39 | CH₃ | C₂H₅ | CH₂OCOCH₃ | 122.5–123.5 |
| 50 | Product of Example 37 | CH₃ | C₂H₅ | COOCH₃ | 178.5–180.0 |

Example 51

*Preparation of 3-acetyl-1-ethyl-5-methoxy-2,6-dimethylindole.*—A mechanically stirred mixture of 12.9 g. of 1-ethyl-5-methoxy-2,6-dimethylindole (Example 23) and 10 g. of sodium acetate in 300 ml. of acetic anhydride is heated at reflux temperature for 6 hours. The reaction mixture is cooled, poured onto crushed ice and stirred for 3 hours. The reaction mixture is warmed on the steam-bath and then stirred for an additional 30 minutes and then extracted with methylene chloride. The extract is successively washed with water, saturated sodium bicarbonate solution and finally with water. The organic solution is dried over anhydrous sodium sulfate and taken to dryness to give 14 g. of an oil. A sample of the oil is distilled and the fraction boiling at 150–170° C./0.2 mm. Hg is crystallized from petroleum ether (B.P. 30–60°) to give a white solid, M.P. 88–89° C.

Example 52

*Preparation of 1-ethyl-5-hydroxy-2,6-dimethyl-3-indolecarboxaldehyde.*—A mixture of 38.4 g. of 1-ethyl-5-methoxy-2,6-dimethyl-3-indolecarboxaldehyde (Example 40) and 46.0 g. of aluminum chloride in 1 l. of xylene is mechanically stirred at reflux temperature for 5 hours. The cooled mixture is treated with cracked ice and digested to give 38.0 g. of pink solid, M.P. 246–250° C. dec. A sample is recrystallized from acetone to give cream-colored crystals, M.P. 256–259° C. dec.

Example 53

*Preparation of 3-acetyl-1-ethyl-5-hydroxy-2,6-dimethylindole.*—A mixture of 12 g. of the crude 3-acetyl-1-ethyl-5-methoxy-2,6-dimethylindole (Example 51) and 13.1 g. of aluminum chloride in 450 ml. of xylene is mechanically stirred at reflux temperature for 5 hours. The cooled mixture is treated with cracked ice and digested to give 8.2 g. of a pink solid, M.P. 250–255° C. A sample is recrystallized from acetone to give cream colored crystals, M.P. 262–265° C. dec.

Example 54

*Preparation of ethyl 1-ethyl-2,6-dimethyl-4,5-dioxo-3-indolecarboxylate.*—To a mechanically stirred solution of 18.0 g. of potassium nitrosodisulfonate in 400 ml. of water and 200 ml. of M/6 potassium dihydrogen phosphate is added a solution of 2.47 g. of ethyl 1-ethyl-5-hydroxy-2,6-dimethyl-3-indolecarboxylate (Example 7) in 500 ml. of acetone. The resulting brown solution becomes purple in 5–10 min. and is allowed to stand at room temperature for 16 hours. The solution is diluted with water and extracted with methylene chloride. The combined extracts are dried over magnesium sulfate and taken to dryness. The residue crystallizes upon trituration with ether. This material is crystallized from acetone-petroleum ether (B.P. 60–70° C.) to give, in three crops, 1.545 g. of black crystals, M.P. 115–118° C.

Example 55

*Preparation of 1-ethyl-2,6-dimethyl-4,5-dioxo-3-indolecarboxaldehyde.*—To a mechanically stirred solution of 50.0 g. (0.187 mole) of potassium nitrosodisulfonate in 1440 ml. of M/6 potassium dihydrogen phosphate solution and 2510 ml. of water is added a solution of 18.75 g. (0.0864 mole) of 1-ethyl-5-hydroxy-2,6-dimethyl-3-indolecarboxaldehyde (Example 52) in 3950 ml. of hot acetone. Some solid separates, and an additional 400 ml. of acetone is added. The initially blue solution turns brown on addition of the aldehyde and becomes purple within 5 minutes. Stirring is continued at room temperature for 1 hour. The reaction mixture is then concentrated under reduced pressure, 3200 ml. of distillate being collected. The concentrate is chilled and filtered. The residue is washed well with water and air-dried to give 16.05 g. of black needles, M.P. 205–208° C. A sample is recrystallized from acetone-hexane to give black needles, M.P. 214–216° C.

Example 56

*Preparation of 3-acetyl-1-ethyl-2,6-dimethyl-4,5-dioxoindole.*—To a mechanically stirred solution of 2.05 g. of potassium nitrosodisulfonate in 153 ml. of M/6 potassium dihydrogen phosphate solution and 300 ml. of water is added a solution of 295 mg. of 3-acetyl-1-ethyl-5-hydroxy-2,6-dimethylindole (Example 53) in 300 ml. of hot acetone. The initially blue solution turns brown on addition of the indole and becomes purple within 30 minutes. Stirring is continued at room temperature for 4 hours. The solution is diluted with an equal volume of water and extracted with methylene chloride. The combined extracts are washed with saline, dried over anhydrous sodium sulfate and concentrated to small volume and filtered. The filtrate is evaporated with concomitant addition of petroleum ether (30–60° C.). Once crystallization begins, the mixture is cooled. Filtration gives 176 mg. of dark brown solid, M.P. 162–165° C. A sample is recrystallized from methylene chloride-petroleum ether (30–60° C.) to give dark brown needles, M.P. 164–166° C.

Example 57

*Preparation of ethyl 1-ethyl-4,5,7-trihydroxy-2,6-dimethyl-3-indolecarboxylate triacetate.*—To a solution of 400 mg. of ethyl 1-ethyl-2,6-dimethyl-4,5-dioxo-3-indolecarboxylate (Example 54) in 6 ml. of acetic anhydride is added 0.125 ml. of boron trifluoride etherate; the purple solution immediately turns brown. It is kept at room temperature for 1 hour, and then poured onto cracked ice. After the excess acetic anhydride hydrolyzes, the mixture is extracted with methylene chloride. The extract is taken to dryness and the amorphous residue crystallizes with ether to give 450 mg. of crystals, M.P. 155–158° C. Two recrystallizations from acetone-petroleum ether (B.P. 30–60° C.) give white crystals, M.P. 157–159° C.

Example 58

*Preparation of 1-ethyl-4,5,7-trihydroxy-2,6-dimethyl-3-indolecarboxaldehyde triacetate.*—To a magnetically stirred mixture of 10.00 g. (43.3 mmoles) of 1-ethyl-2,6-dimethyl-4,5-dioxo-3-indolecarboxaldehyde (Example 55) in 150 ml. of acetic anhydride is added 2 ml. of boron trifluoride etherate. All solid quickly dissolves and the purple mixture becomes brown and is stirred at room temperature for 1 hour. Cracked ice is added, and the mixture is stirred at room temperature until the excess acetic anhydride hydrolyzes. The resulting solid is collected by filtration and washed with water to give 12.5 g. of grey solid, M.P. 173–180° C. A sample is recrystallized from acetone-hexane to give white crystals, M.P. 194–195° C.

Example 59

*Preparation of 4,5,7-triacetoxy-3-acetyl-1-ethyl-2,6-dimethylindole enol acetate.*—To a magnetically stirred mixture of 657 mg. of 3-acetyl-1-ethyl-2,6-dimethyl-4,5-dioxoindole (Example 56) in 8 ml. of acetic anhydride is added 0.2 ml. of boron trifluoride etherate. The solid dissolves and the purple mixture becomes dark brown and is stirred at room temperature for several hours. Cracked ice is added, and the mixture is stirred until the excess acetic anhydride hydrolyzes. The resulting solid is collected by filtration and washed with water to give 888 mg. of brown solid. The crude material is triturated with cold methanol to give 467 mg. of a yellow solid, M.P. 195–200° C.

Example 60

*Preparation of 1-ethyl-5-hydroxy-2,6-dimethyl-4,7-dioxo-3-indolecarboxylic acid.*—A mixture of 2.55 g. of ethyl 1-ethyl-4,5,7-trihydroxy-2,6-dimethyl-3-indolecarboxylate triacetate (Example 57) in 100 ml. of water and 20 ml. of 25% sodium hydroxide solution is heated at reflux temperature in an atmosphere of nitrogen with magnetic stirring for 30 minutes. The undissolved solid is collected by filtration to give 0.489 g. of solid. The filtrate is treated with a stream of air for 30 minutes. This purple solution is acidified by dropwise addition of concentrated hydrochloric acid solution, and the resulting solution is extracted with methylene chloride. The extract is taken to dryness and the residue is crystallized from methylene chloride-petroleum ether (B.P. 60–70° C.) to give 1.010 g. of red needles, M.P. 220–223° C.

Example 61

*Preparation of 1-ethyl-5-hydroxy-2,6-dimethyl-4,7-dioxo-3-indolecarboxaldehyde.*—A mechanically stirred mixture of 30.10 g. (0.080 mole) of 1-ethyl-4,5,7-trihydroxy-2,6-dimethyl-3-indolecarboxaldehyde triacetate (Example 58) in 500 ml. of water and 125 ml. of 25% sodium hydroxide solution is heated at reflux temperature under nitrogen for 1 hour. All solid dissolves and the brown solution is quickly filtered. A stream of air is passed through the filtrate for 35 minutes. The resulting purple solution is acidified by addition of 37% hydrochloric acid solution. Once acid, a red solid separates from the solution. It is extracted into methylene chloride and the extracts are dried over magnesium sulfate and evporated with concomitant addition of petroleum ether (B.P. 30–60° C.). One crystallization begins, the mixture is placed in the refrigerator. Filtration gives 13.6 g. of rose needles, M.P. 213–215° C. Concentration of the filtrate gives an additional 2.9 g. of this quinone.

Example 62

*Preparation of 3-acetyl-1-ethyl-5-hydroxy-2,6-dimethyl-4,7-dioxoindole.*—A magnetically stirred mixture of 53 mg. of 4,5,7-triacetoxy-3-acetyl-1-ethyl-2,6-dimethyl indole enol acetate (Example 59) in 3 ml. of water and 0.4 ml. of 25% sodium hydroxide solution is heated at reflux temperature, under nitrogen, until solution occurs. The reaction mixture is filtered and a stream of air is passed through the filtrate for 40 minutes. The resulting purple solution is acidfied by addition of 37% hydrochloric acid solution. The acid solution is extracted with methylene chloride and the extracts washed with water. The organic solution is dried over anhydrous sodium sulfate and taken to dryness. The residue is recrystallized from methylene chloride-petroleum ether (30–60° C.) to give 11 mg. of red crystals, M.P. 172–175° C.

Example 63

*Preparation of methyl 1-ethyl-5-methoxy-2,6-dimethyl-4,7-dioxo-3-indolecarboxylate.*—A magnetically stirred mixture of 681 mg. of 1-ethyl-5-hydroxy-2,6-dimethyl-4,7-dioxo-3-indolecarboxylic acid (Example 60), 5.5 g. of potassium carbonate and 11 ml. of dimethyl sulfate in 250 ml. of acetone is heated at reflux temperature for 45 minutes and then stirred at room temperature for 2 hours. The mixture is filtered and the residue is washed well with acetone. The combined filtrate and washings are concentrated, most of the excess alkylating agent being removed on the steam-bath at water-pump pressure. The residue crystallizes from dilute acetone to give 490 mg. of orange crystals, M.P. 82–83° C.

Example 64

*Preparation of 1-ethyl-5-methoxy-2,6-dimethyl-4,7-dioxo-3-indolecarboxaldehyde.*—A mechanically stirred mixture of 21.9 g. (0.089 mole) of 1-ethyl-5-hydroxy-2,6- dimethyl-4,7-dioxo-3-indolecarboxaldehyde (Example 61) 100 g. of potassium carbonate and 6.75 g. of dimethyl sulfate in 1 l. of acetone is heated at reflux temperature for 1 hour, whereafter stirring is continued at room temperature for 3 hours. The mixture is filtered and the residue is washed well with acetone. The combined filtrate and washings are evaporated, the excess dimethyl sulfate being removed at oil-pump pressure. The residue is dissolved in 200 ml. of acetone and treated, with magnetic stirring, with about 800 ml. of water. Stirring is continued for 30 minutes, and the resulting mixture is chilled and filtered to furnish 18.9 g. of needles, M.P. 124–127° C. For purification this material is dissolved in methylene chloride and passed through a magnesia-silica gel column, methylene chloride being used as a wash solvent. The eluate is essentially colorless after 2.5 l. is collected. The solvent is removed and the residue is crystallized from methylene chloride-petroleum ether (B.P. 30–60° C.) to give 15.08 g. of red needles, M.P. 133–135° C.

Example 65

*Preparation of 5-ethoxy-1-ethyl-2,6-dimethyl-4,7-dioxo-3-indolecarboxaldehyde.*—1 - ethyl-5-hydroxy-2,6-dimethyl-4,7-dioxo-3-indolecarboxaldehyde (1.0 g.) (Example 61) in tetraethoxymethane is heated at reflux temperature for 3 hours. The mixture is distilled almost to dryness. Methanol (4 ml.) is added and red-orange crystals precipitate. These are collected and washed with methanol to give orange-red needles, M.P. 117–119° C.

Example 66

*Preparation of 3-acetyl-1-ethyl-5-methoxy-2,6-dimethyl-4,7-dioxoindole.*—A magnetically stirred mixture of 163 mg. of 3-acetyl-1-ethyl-5-hydroxy-2,6-dimethyl-4,7-dioxoindole (Example 62), 1.6 g. of potassium carbonate and 4 ml. of dimethyl sulfate in 93 ml. of acetone is heated at reflux temperature for 45 minutes and then stirred at room temperature for 2 hours. The mixture is filtered and the residue washed with acetone. The combined filtrate and washings are concentrated, most of the excess alkylating agent being removed on the steam-bath at reduced pressure. The residue is dissolved in a minimum amount of benzene and placed on a magnesia-silica gel column, ether being used as a wash solvent. The combined washings are concentrated to dryness and the residue is recrystallized from methylene chloride-petroleum ether (30–60 C.) to give 91 mg. of orange crystals, M.P. 126–127° C.

Example 67

*Preparation of 5-methoxy-6-methylindole.*—5-methoxy-6-methyl-2-indolecarboxylic acid (Example 35) (3.61 g., 17.6 mmoles) is heated at 260–270° C. until the melt becomes quiescent and then taken to and held briefly at 300° C. The cooled material is dissolved in ether, and this solution is washed with sodium carbonate solution, treated with activated carbon, dried over magnesium sulfate and taken to dryness. The solid is recrystallized from ether-petroleum ether to give 2.12 g. of crystals, M.P. 119–120° C.

Example 68

*Preparation of 5-methoxy - 6 - methyl-3-indolecarboxaldehyde.*—To 3.5 ml. of dimethylformamide is added with magnetic stirring and ice cooling 1.69 g. (11 mmoles, 1 ml.) of phosphorus oxychloride. To this solution is then added dropwise a solution of 1.61 g. (10 mmoles) of 5-methoxy-6-methylindole (Example 67) in 8 ml. of dimethylformamide. The temperature of the reaction is kept below 10° C. during the addition which requires 20 minutes. A solid separates 15 minutes after the start of the addition. Upon completion of the addition, the ice bath is removed and replaced by a warm water bath. The paste is kept at 30–35° C. with magnetic stirring for 45 minutes. Crushed ice is added to the mixture which is then treated with a solution of 4.5 g. of sodium hydroxide in 20 ml. of water. The mixture is brought to boiling and then chilled in an ice bath to give 1.74 g. of tan solid, M.P. 192–195° C.

Example 69

*Preparation of 1-ethyl - 5 - methoxy-6-methyl-3-indolecarboxaldehyde.*—A mixture of 1.75 g. (9.2 mmoles) of 5-methoxy-6-methyl - 3 - indolecarboxaldehyde (Example 68) and 30 ml. of 40% potassium hydroxide solution is heated with mechanical stirring on the steam bath. When the mixture becomes hot, all solid dissolves and 10.0 g. (65 mmoles, 8.5 ml.) of ethyl sulfate is added in five equal portions over 1 hour. The solution is allowed to cool, whereon crystals separate from the aqueous solution. The mixture is extracted with ethyl acetate, and the extract is washed with saline, dried over magnesium sulfate and evaporated. The residue crystallizes from ether-petroleum ether (B.P. 30–60° C.) to give 1.287 g. of crystals, M.P. 92–94° C.

Example 70

*Preparation of 1-ethyl-5-methoxy-6-methyl-4-nitro-3-indolecarboxaldehyde.*—To an ice chilled, magnetically stirred solution of 1.085 g. (5.0 mmoles) of 1-ethyl-5-methoxy-6-methyl-3-indolecarboxaldehyde (Example 69) in 12 ml. of concentrated sulfuric acid is added dropwise over 30 minutes a solution of 0.425 g. (5.0 mmoles) of sodium nitrate in 7 ml. of concentrated sulfuric acid. The resulting solution is stirred for an additional 45 minutes and then poured onto a cracked ice-water mixture. The solid is extracted into methylene chloride and the extract is washed to neutrality with saline, dried with magnesium sulfate and evaporated. The residue is crystallized from acetone-hexane to give 525 mg. of light yellow solid, M.P. 150–152° C.

Example 71

*Preparation of 1-ethyl-5-methoxy-2,6-dimethyl-4-nitro-3-indolecarboxaldehyde.*—In the manner described in Example 70 treatment of 1-ethyl-5-methoxy-2,6-dimethyl-3-indolecarboxaldehyde (Example 40) with sodium nitrate in sulfuric acid produces orange crystals, M.P. 155–157° C.

Example 72

*Preparation of methyl 1-ethyl-3-formyl-5-methoxy-6-methyl-4-nitro-2-indolecarboxylate.*—To a magnetically stirred solution of 10.0 g. of methyl 1-ethyl-3-formyl-5-methoxy-6-methyl-2-indolecarboxylate (Example 50) in 300 ml. of glacial acetic acid is added dropwise 10 ml. of yellow fuming nitric acid; stirring is continued for one hour after completion of the addition. Water is added, and the orange solid is collected by filtration. Recrystallization from acetone-hexane gives light orange crystals, M.P. 182–184° C.

Example 73

*Preparation of methyl 1-ethyl-3-formyl-6-methyl-4,5-dioxo-2-indolecarboxylate.*—The filtrate obtained from Example 72 is extracted with methylene chloride. The combined extracts are washed with saline, dried over sodium sulfate and evaporated. The residue is recrystallized from acetone-hexane to give red needles, M.P. 207–210° C.

Examples 74–82

In the manner described in Example 72 the compounds of Table VI are obtained.

TABLE VI

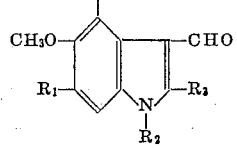

| Example No. | Starting Material | Product | | | M.P., °C. |
|---|---|---|---|---|---|
| | | $R_1$ | $R_2$ | $R_3$ | |
| 74 | Product of Example 41 | $CH_3$ | H | $CH_3$ | 280 |
| 75 | Product of Example 42 | $CH_3$ | $CH_3$ | $CH_3$ | 183–187 |
| 76 | Product of Example 43 | $CH_3$ | $C_3H_7$ | $CH_3$ | 136–138 |
| 77 | Product of Example 44 | $CH_3$ | $(CH_3)_2CH$ | $CH_3$ | Crude |
| 78 | Product of Example 45 | $CH_3$ | $C_4H_9$ | $CH_3$ | 127–128 |
| 79 | Product of Example 46 | $CH_3$ | $C_2H_5$ | $C_2H_5$ | 151–154 |
| 80 | Product of Example 47 | $C_2H_5$ | $C_2H_5$ | $CH_3$ | 181.0–182.5 |
| 81 | Product of Example 48 | $CH_3$ | $CH_2CH_2OSO_2CH_3$ | $CH_3$ | 181.5–183.0 |
| 82 | Product of Example 49 | $CH_3$ | $C_2H_5$ | $CH_2O\overset{O}{\overset{\|}{C}}CH_3$ | 198–200 |

Example 83

*Preparation of 1 - ethyl - 3 - formyl 5 - methoxy - 6 - methyl - 4 - nitro - 2 - indolecarboxylic acid.*—A magnetically stirred mixture of 8.0 g. of methyl 1 - ethyl - 3 - formyl - 5 - methoxy - 6 - methyl - 4 - nitro - 2 - indolecarboxylate (Example 72) and 250 ml. of 5% sodium hydroxide is heated at reflux for 1.5 hours. The solution is cooled and acidified with concentrated hydrochloric acid solution. The precipitated solid is collected by filtration and crystallized from acetone to give yellow crystals, M.P. 216–217° C.

Example 84

*Preparation of 1-ethyl-3-formyl-5-methoxy-6-methyl-4-nitro-2-indolecarboxamide.*—To an ice-chilled, magnetically stirred solution of 2.154 g. of 1-ethyl-3-formyl-5-methoxy - 6 - methyl - 4 - nitro - 2 - indolecarboxylic acid (Example 83) and 1.14 ml. of triethylamine in 60 ml. of N,N-dimethylformamide is added dropwise 0.79 ml. of ethyl chlorocarbonate at such a rate that the temperature is maintained between 0–5° C. A solid separates. Ammonia gas is then passed into the reaction mixture for 10 minutes. The resulting mixture is diluted with water and cooled in an ice-bath to give a solid which is recrystallized from acetone to give white crystals, M.P. 252–254° C.

Example 85

*Preparation of 1 - (β - fluoroethyl) - 5 - methoxy - 2,6 - dimethyl - 4 - nitro - 3 - indolecarboxaldehyde.*—A mixture of 5.00 g. of 1 - (β - methanesulfonyloxyethyl) - 5 - methoxy - 2,6 - dimethyl - 4 - nitro - 3 - indolecarboxaldehyde (Example 81) and 5.00 g. of powdered potassium fluoride dihydrate in 160 ml. of methanol is placed in a stainless steel bomb and heated at 150° C. for 18 hours. The bomb is cooled, and its contents are distributed between methylene chloride and water. The organic layer is washed with saline, dried over magnesium sulfate and evaporated. The residue is recrystallized from acetone-petroleum ether (B.P. 60–70° C.) to give yellow crystals, M.P. 175–178° C.

Example 86

*Preparation of 1 - (β - acetoxyethyl) - 5 - methoxy - 2,6 - dimethyl - 4 - nitro - 3 - indolecarboxaldehyde.*—A mixture of 500 mg. of 1 - (β - methanesulfonyloxyethyl) - 5 - methoxy - 2,6 - dimethyl - 4 - nitro - 3 - indolecarboxaldehyde (Example 81) and 1.00 g. of sodium acetate in 25 ml. of dimethylformamide is heated on the steam bath for 15 hours. The mixture is diluted with water, and the precipitated solid is collected by filtration and recrystallized from acetone-petroleum ether (B.P. 60–60° C.) to give crystals, M.P. 179–180° C.

Example 87

*Preparation of 4 - amino - 5 - methoxy - 1,2,6 - trimethyl-3-indolecarboxaldehyde.*—A mechanically stirred solution of 13.15 g. of 5 - methoxy - 1,2,6 - trimethyl - 4 - nitro - 3 - indolecarboxaldehyde (Example 75) in 875 ml. of alcohol and 375 ml. of water is heated to steambath temperature. A solution of 134 g. of ferrous sulfate heptahydrate in 1250 ml. of water is added, and the mixture is heated to boiling. At 30–60 second intervals 10 ml. of concentrated ammonium hydroxide solution is added until a total of 150 ml. is added. The resulting mixture is heated for 15 minutes after the last addition and then filtered. The residual cake is washed thoroughly with methylene chloride. The combined filtrate and washings are shaken well, and the organic layer is separated. The aqueous phase is extracted further with methylene chloride, and the combined organic solutions are washed several times with dilute hydrochloric acid solution. The combined acid washes are neutralized by pouring onto a sodium carbonate slurry. The resulting mixture is extracted well with methylene chloride; the extracts are dried over magnesium sulfate and evaporated. The residue crystallizes from methylene chloride-petroleum ether (B.P. 30–60° C.) to give tan crystals, M.P. 150–154° C.

Examples 88–94

In the manner described in Example 87 the compounds of Table VII are obtained.

TABLE VII

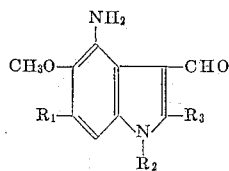

| Example No. | Starting Material | Product R₁ | Product R₂ | Product R₃ | M.P., °C. |
|---|---|---|---|---|---|
| 88 | Product of Example 71 | $CH_3$ | $C_2H_5$ | $CH_3$ | 117.5–118.5 |
| 89 | Product of Example 79 | $CH_3$ | $C_2H_5$ | $C_2H_5$ | Oil |
| 90 | Product of Example 76 | $CH_3$ | $C_3H_7$ | $CH_3$ | 128–129 |
| 91 | Product of Example 78 | $CH_3$ | $C_4H_9$ | $CH_3$ | 129.5–131.0 |
| 92 | Product of Example 82 | $CH_3$ | $C_2H_5$ | $CH_2OH$ | 182.0–182.5 |
| 83 | Product of Example 82 | $CH_3$ | $C_2H_5$ | $CH_2O\overset{O}{\overset{\|}{C}}CH_3$ | 136–138 |
| 94 | Product of Example 84 | $CH_3$ | $C_2H_5$ | $CONH_2$ | 202–203 |

Example 95

*Preparation of 4 - amino - 1 - (β - methanesulfonyloxyethyl) - 5 - methoxy - 2,6 - dimethyl - 3 - indolecarboxaldehyde.*—A mechanically stirred solution of 15.00 g. of 1 - (β - methanesulfonyloxyethyl) - 5 - methoxy - 2,6 - dimethyl - 4 - nitro - 3 - indolecarboxaldehyde (Example 81) in 450 ml. of glacial acetic acid and 45 ml. of water is heated to steam-bath temperature, and 20.00 g. of iron filings are added in thirteen approximately equal portions over 2 hours. An additional 45 ml. of water is added after 45 minutes, and the reaction is heated 30 minutes after the last addition of iron filings. Water is added, and the mixture is extracted with methylene chloride. The combined extracts are washed with water, potassium carbonate solution and finally with water, dried over magnesium sulfate and evaporated. The residue is recrystallized from methylene chloride-petroleum ether (B.P. 30–60° C.) to give tan crystals, M.P. 133–135° C.

Examples 96–100

In the manner described in Example 95 the compounds of Table VIII are obtained.

TABLE VIII

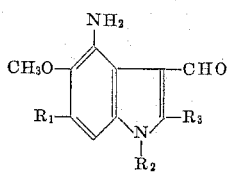

| Example No. | Starting Material | Product R₁ | Product R₂ | Product R₃ | M.P., °C. |
|---|---|---|---|---|---|
| 96 | Product of Example 74 | $CH_3$ | H | $CH_3$ | Crude |
| 97 | Product of Example 77 | $CH_3$ | $CH(CH_3)_2$ | $CH_3$ | Oil |
| 98 | Product of Example 80 | $C_2H_5$ | $C_2H_5$ | $CH_3$ | 110.5–112.5 |
| 99 | Product of Example 85 | $CH_3$ | $CH_2CH_2F$ | $CH_3$ | 139–141 |
| 100 | Product of Example 86 | $CH_3$ | $CH_2CH_2O\overset{O}{\overset{\|}{C}}CH_3$ | $CH_3$ | 178–180 |

Example 101

*Preparation of 4 - amino-1-(β-azidoethyl)-5-methoxy-2,6-dimethyl-3-indolecarboxaldehyde.*—A mixture of 300 mg. of 4 - amino-1-(β-methanesulfonyloxyethyl)-5-methoxy-2,6-dimethyl-3-indolecarboxaldehyde (Example 95) and 300 mg. of sodium azide in 10 ml. of dimethylformamide is heated on the steam bath for 16 hours. The resulting mixture is poured into 150 ml. of water and cooled in an ice-bath to give solid which is recrystallized from methylene chloride-petroleum ether to furnish tan crystals, M.P. 123–124° C.

Examples 102–104

In the manner described in Example 101 treatment of 4 - amino-1-(β-methanesulfonyloxyethyl)-5-methoxy-2,6-dimethyl-3-indolecarboxaldehyde (Example 95) with the appropriate nucleophile gives the compounds of Table IX.

TABLE IX

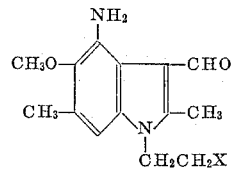

| Example No. | Nucleophile | Product X | M.P., °C. |
|---|---|---|---|
| 102 | KSCN | SCN | 190–193 |
| 103 | LiCl | Cl | 120–123 |
| 104 | NaSCH₃ ᵃ | SCH₃ | 128.5–130.0 |

ᵃ Acetone solvent.

Example 105

*Preparation of 4-amino-1-(β-hydroxyethyl)-5-methoxy-2,6 - dimethyl - 3-indolecarboxaldehyde.*—A solution of 2.466 g. of 1-(β-acetoxyethyl)-4-amino-5-methoxy-2,6-dimethyl-3-indolecarboxaldehyde (Example 100) in 100 ml. of methanol containing 6 ml. of 10% potassium carbonate solution is stirred at room temperature under nitrogen for 1 hour. Approximately half the solvent is removed after acidification with 0.45 ml. of acetic acid.

Example 106

Preparation of 5-methoxy-1,2,6-trimethyl-4,7-dioxo-3-indolecarboxaldehyde.—A solution of 5.38 g. of 4-amino-1,2,6 - trimethyl-5-methoxy-3-indolecarboxaldhyde (Example 87) in 1 l. of acetone is added to a magnetically stirred solution of 25.0 g. of potassium nitrosodisulfonate (Fremy's salt) in 800 ml. of water and 400 ml. of M/6 potassium dihydrogen phosphate solution. Stirring is continued for 2 hours, and the mixture is allowed to stand at room temperature for 15 hours, whereafter it is diluted with water and extracted with methylene chloride. The combined extracts are dried over magnesium sulfate and evaporated. The residue is dissolved in methylene chloride and chromatographed on magnesia-silica gel. The material eluted by methylene chloride is recrystallized from methylene chloride-petroleum ether (B.P. 30–60° C.) to give red-orange needles, M.P. 146–148° C.

Examples 107–123

In the manner described in Example 106 the products of Table X are obtained.

Example 126

Preparation of methyl 4,5,7 - triacetoxy-3-diacetoxymethyl - 1 - ethyl-6-methyl-2-indolecarboxylate.—In the manner described in Example 57 treatment of methyl 1-ethyl - 3 - formyl-6-methyl-4,5-dioxo-2-indolecarboxylate (Example 73) with acetic anhydride and boron trifluoride etherate gives crystals, M.P. 139–149° C.

Example 127

Preparation of 1-ethyl-3-formyl-5-hydroxy-6-methyl-4,7-dioxo-2-indolecarboxylic acid.—In the manner described in Example 60 hydrolysis of methyl 4,5,7-triacetoxy - 3 - diacetoxymethyl - 1 - ethyl - 6 - methyl - 2-indolecarboxylate (Example 126) with sodium hydroxide solution and subsequent air oxidation of the alkaline solution produces orange crystals, M.P. 161–163° C.

Example 128

Preparation of methyl 1-ethyl-3-formyl-5-methoxy-6-methyl-4,7-dioxo-2-indolecarboxylate.—In the manner described in Example 63 treatment of 1-ethyl-3-formyl-5-hydroxy-6-methyl-4,7-dioxo-2-indolecarboxylic acid (Example 127) with methyl sulfate and potassium carbonate in acetone produces a yellow oil.

TABLE X

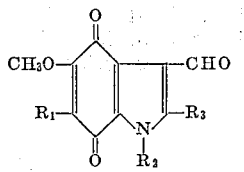

| Example No. | Starting Material | Product | | | M.P., °C. |
|---|---|---|---|---|---|
| | | $R_1$ | $R_2$ | $R_3$ | |
| 107 | Product of Example 96 | $CH_3$ | H | $CH_3$ | 236–240 |
| 108 | Product of Example 88 | $CH_3$ | $C_2H_5$ | $CH_3$ | 125–129 |
| 109 | Product of Example 90 | $CH_3$ | $C_3H_7$ | $CH_3$ | 134–135 |
| 110 | Product of Example 97 | $CH_3$ | $CH(CH_3)_2$ | $CH_3$ | 97–99 |
| 111 | Product of Example 91 | $CH_3$ | $C_4H_9$ | $CH_3$ | 82.5–83.0 |
| 112 | Product of Example 89 | $CH_3$ | $C_2H_5$ | $C_2H_5$ | 76.0–77.5 |
| 113 | Product of Example 98 | $C_2H_5$ | $C_2H_5$ | $CH_3$ | 83.0–83.5 |
| 114 | Product of Example 95 | $CH_3$ | $CH_2CH_2OSO_2CH_3$ | $CH_3$ | 143–144 |
| 115 | Product of Example 93 | $CH_3$ | $C_2H_5$ | $CH_2O\overset{O}{\overset{\|}{C}}CH_3$ | 142–144 |
| 116 | Product of Example 92 | $CH_3$ | $C_2H_5$ | $CH_2OH$ | 128.5–130.0 |
| 117 | Product of Example 99 | $CH_3$ | $CH_2CH_2F$ | $CH_3$ | 114–117 |
| 118 | Product of Example 101 | $CH_3$ | $CH_2CH_2N_3$ | $CH_3$ | 80–81 |
| 119 | Product of Example 102 | $CH_3$ | $CH_2CH_2SCN$ | $CH_3$ | Solid |
| 120 | Product of Example 103 | $CH_3$ | $CH_2CH_2Cl$ | $CH_3$ | 113.0–113.5 |
| 121 | Product of Example 104 | $CH_3$ | $CH_2CH_2SCH_3$ | $CH_3$ | 77–79 |
| 122 | Product of Example 105 | $CH_3$ | $CH_2CH_2OH$ | $CH_3$ | 129–131 |
| 123 | Product of Example 94 | $CH_3$ | $C_2H_5$ | $CONH_2$ | 197–199 |

Example 124

Preparation of 1-ethyl-5-methoxy-6-methyl-4,7-dioxo-2-tetrahydropyranyloxymethyl - 3-indolecarboxaldehyde.—A solution of 226 mg. of 1-ethyl-2-hydroxymethyl-5-methoxy - 6-methyl-4,7-dioxo-3-indolecarboxaldehyde (Example 116), 10 mg. of p-toluenesulfonic acid monohydrate and 92 mg. of dihydropyran in 30 ml. of benzene is stirred at room temperature for 3 hours. The solution is washed with sodium bicarbonate solution and then water, dried over sodium sulfate and evaporated to give a yellow oil.

Example 125

Preparation of 5-methoxy-2,6-dimethyl-4,7-dioxo-1-(β-tetrahydropyranyloxyethyl) - 3 - indolecarboxaldehyde.— In the manner described in Example 128 treatment of 1-(β - hydroxyethyl) - 5-methoxy-2,6-dimethyl-4,7-dioxo-3-indolecarboxaldehyde (Example 122) with p-toluenesulfonic acid monohydrate and dihydropyran in ethyl acetate produces a red oil.

Example 129

Preparation of 1-ethyl-4,5,6,7-tetrahydro-2-methyl-4-oxoindole.—A mixture of 33 g. of 2-acetonyl-1,3-cyclohexanedione [H. Stetter and R. Lauterbach, Ann. 652, 43 (1962)], 20 g. of ethylamine and 135 ml. of methanol is heated in a steel bomb at 150° C. for 12 hours. The methanol is removed by concentration at reduced pressure and the residual mixture is heated with 200 ml. of methylene chloride and 400 ml. of water. The organic layer is washed two times with 5% sodium hydroxide solution, once with water, then dried and concentrated. The crystalline residue is washed with cyclohexane containing a small amount of ether. Recrystallization of this residue from cyclohexane affords 18.8 g. of 1-ethyl-4,5,6,7-tetrahydro-2-methyl-4-oxoindole, M.P. 74–75° C.

Example 130

Preparation of 2,6-dimethyl-1-ethyl-4,5,6,7-tetrahydro-4-oxoindole.—In the manner described in Example 129 treatment of 2-acetonyl-5-methyl-1,3-cyclohexanedione [H. Stetter and R. Lauterbach, Ann. 652, 43 (1962)] with ethylamine gives white needles, M.P. 77–79° C.

Example 131

*Preparation of 1-ethyl-4-hydroxy-2-methylindole.*—A mixture of 10.5 g. of 1-ethyl-4,5,6,7-tetrahydro-2-methyl-4-oxoindole (Example 129), 2.5 g. of 10% palladium-on-charcoal and 50 ml. of cumene is heated at reflux temperature for 3 hours, then cooled and filtered. The filtrate is extracted with 100 ml. of 5% sodium hydroxide solution and this extract is layered with methylene chloride and carefully neutralized with acetic acid. The methylene chloride layer is washed with sodium bicarbonate solution, dried and concentrated and the residue is extracted with 500 ml. of boiling n-hexane. White crystals of 1-ethyl-4-hydroxy-2-methylindole form on cooling the extract. They have M.P. 98–102° C.

Example 132

*Preparation of 2,6-dimethyl-1-ethyl-4-hydroxyindole.*— In the manner described in Example 131 treatment of 2,6 - dimethyl - 1 - ethyl - 4,5,6,7 - tetrahydro - 4 - oxoindole (Example 130) with 10% palladium-on-charcoal in cumene gives grey-white prisms, M.P. 141–143° C.

Example 133

*Preparation of 2,6-dimethyl-1-ethyl-5hydroxymethylene-4,5,6,7-tetrahydro-4-oxoindole.*—An ice-cooled suspension of 64.8 g. of sodium methoxide in 600 ml. of benzene is treated with a solution of 88.8 g. of ethyl formate and 65.7 g. of 2,6-dimethyl-1-ethyl-4,5,6,7-tetrahydro-4-oxoindole (Example 130) in 600 ml. of benzene. The mixture is stirred at room temperature overnight, then cooled in an ice bath and treated with 1200 ml. of 5% sodium hydroxide solution. The benzene layer is extracted with an additional 10 ml. of 5% sodium hydroxide solution and the combined alkaline extracts are cooled in an ice bath, layered with 1200 ml. of benzene and acidified with 6N hydrochloric acid. Concentration of the benzene layer affords 70.2 g. (96.1%) of grey solid that gives on recrystallization from petroleum ether greyish-white needles, M.P. 71–74° C.

Example 134

*Preparation of 2,6-dimethyl-1-ethyl-4-hydroxy-5-indolecarboxaldehyde.*—To a solution of 4.51 g. of 2,6-dimethyl - 1 - ethyl - 5 - hydroxymethylene - 4,5,6,7 - tetrahydro-4-oxoindole (Example 133) in 30 ml. of dioxane is added a solution of 4.54 g. of dichlorodicyanobenzoquinone in 30 ml. of dioxane. After one hour the mixture is filtered and the filtrate is concentrated. Recrystallization of the residue from hexane gives 2.28 g. of yellow rods, M.P. 129–130.5° C.

Example 135

*Preparation of 1-ethyl-4-hydroxy - 2,5,6 - trimethylindole.*—A solution of 1.09 g. of 1-ethyl-4-hydroxy-2,6-dimethyl-5-indolecarboxaldehyde (Example 134) in ethanol is treated with 1.0 g. of 10% palladium-on-carbon and shaken with hydrogen in a Parr apparatus. The mixture is filtered and the filtrate is concentrated to give a yellow oil that crystallizes from hexane, affording 412 mg. of tan solid, M.P. 98–102° C.

Example 136

*Preparation of 4-acetoxy-1-ethyl-2-methylindole.*—A solution of 4.0 g. (22.4 mmole) of 1-ethyl-4-hydroxy-2-methylindole (Example 131) in 75 ml. of water containing 1.35 g. (33.3 mmole) of sodium hydroxide is treated with 3.4 g. (33.3 mmole) of acetic anhydride and .0 g. (33.3 mmole) of sodium acetate. After 20 minutes the mixture is filtered and the solid is dissolved in methylene chloride. This solution is washed two times with sodium bicarbonate solution, dried and concentrated and the dark oily residue is extracted with 40 ml. of boiling n-hexane. On cooling, this extract first gives an oil. The mother liquor is decanted from this oil, affording on further cooling 4-acetoxy-1-ethyl-2-methylindole, white crystals, M.P. 71–73° C.

Example 137

*Preparation of 4-acetoxy-2,6-dimethyl-1-ethylindole.*— In the manner described in Example 136 treatment of 2,6-dimethyl-1-ethyl-4-hydroxyindole (Example 132) with acetic anhydride gives off-white solid, M.P. 61–63° C.

Example 138

*Preparation of 4-acetoxy - 1 - ethyl - 2,5,6 - trimethylindole.*—In the manner described in Example 136 treatment of 1-ethyl-4-hydroxy - 2,5,6 - trimethylindole (Example 135) with acetic anhydride gives pale yellow crystals, M.P. 113–114.5° C.

Example 139

*Preparation of 4-acetoxy-1-ethyl-2-methyl-3-indolecarboxaldehyde.*—To an ice-cooled mixture of 2.0 g. (13.7 mmole) of phosphorous oxychloride and 15 ml. of N,N-dimethylformamide is added dropwise a solution of 3.20 g. (13.7 mmole) of 4-acetoxy-1-ethyl - 2 - methylindole (Example 136) in 15 ml. of N,N-dimethylformamide. After 90 minutes the resulting yellow solution is poured onto a mixture of ice and 10% sodium carbonate solution. The crystalline solid that forms is washed well with water, dissolved in methylene chloride, washed with sodium bicarbonate solution, dried and concentrated under reduced pressure. Crystallization of the residue from methanol affords white needles, M.P. 165–168° C.

Example 140

*Preparation of 4-acetoxy-2,6-dimethyl-1-ethyl-3-indolecarboxaldehyde.*—In the manner described in Example 139 treatment of 4 - acetoxy-2,6-dimethyl-1-ethylindole (Example 137) with phosphorous oxychloride and N,N-dimethylformamide gives off-white fine needles, M.P. 168–171° C.

Example 141

*Preparation of 4 - acetoxy-1-ethyl-2,5,6-trimethyl-3-indolecarboxaldehyde.*—In the manner described in Example 139 treatment of 4-acetoxy-1-ethyl-2,5,6-trimethylindole (Example 138) with phosphorous oxychloride and N,N-dimethylformamide gives yellow needles, M.P. 165–168° C.

Example 142

*Preparation of 1-ethyl-4-hydroxy-2-methyl-3 - indolecarboxaldehyde.*—A mixture of 3.14 g. (12 mmole) of 4 - acetoxy-1-ethyl-2-methyl-3-indolecarboxaldehyde (Example 139), 200 ml. of methanol and 60 ml. of 5% sodium hydroxide solution is stirred and gently warmed until all solid dissolves. It is then cooled, diluted with 200 ml. of water and carefully neutralized with acetic acid. The precipitate that forms is washed well with water, dissolved in methylene chloride solution, washed with sodium bicarbonate solution, dried and concentrated under reduced pressure. Crystallizatiton of the residue from methanol with charcoal decolorization affords 1.16 g. of white needles, M.P. 169–170° C.

Example 143

*Preparation of 2,6-dimethyl-1 - ethyl-4-hydroxy-3-indolecarboxaldehyde.*—In the manner described in Example 142 treatment of 4-acetoxy-2,6-dimethyl-1-ethyl-3-indolecarboxaldehyde (Example 140) with sodium hydroxide solution gives yellow needles, M.P. 178–180° C.

Example 144

*Preparation of 1-ethyl-4-hydroxy-2,5,6-trimethyl-3-indolecarboxaldehyde.*—In the manner described in Example 142 treatment of 4-acetoxy-1-ethyl-2,5,6-trimethyl-3-indolecarboxaldehyde (Example 141) with sodium hydroxide solution gives yellow needles, M.P. 162–163.5° C.

Example 145

*Preparation of 1-ethyl-2-methyl-4,7-dioxo-3-indolecarboxaldehyde.*—To a stirred solution of 1.98 g. (7.4 mmole) of potassium nitrosodisulfonate in 180 ml. of M/18 potassium dihydrogen phosphate is added a hot solution of 375 mg. (1.85 mmole) of 1-ethyl-4-hydroxy-2-methyl-3-indolecarboxaldehyde (Example 142) in 50 ml. of acetone. The mixture is stirred at 40° C. for 10 minutes, then treated with an additional 990 mg. (3.7 mmole) of potassium nitrosodisulfonate in 60 ml. of M/18 potassium dihydrogen phosphate and 40 ml. of hot acetone. After 30 minutes the mixture is cooled, diluted with 400 ml. of water, filtered, and the filtrate is extracted with methylene chloride. This extract is washed with water, dried and concentrated. The residue is extracted with ether and this extract is filtered and concentrated. The residue is dissolved in acetone and passed through a column of magnesia-silica gel (10 x 200 mm.). Concentration of the orange eluate affords 296 mg. of orange prisms, M.P. 123–155° C. Recrystallization from acetone-hexane raises the melting point to 148–155° C.

Example 146

*Preparation of 2,6-dimethyl-1-ethyl-4,7-dioxo-3-indolecarboxaldehyde.*—In the manner described in Example 145 treatment of 2,6 - dimethyl-1-ethyl-4-hydroxy-3-indolecarboxaldehyde (Example 143) with potassium nitrosodisulfonate (20 mmole per mmole of substrate) gives orange needles, M.P. 146–149° C.

Example 147

*Preparation of 1 - ethyl-2,5,6-trimethyl-4,7-dioxo-3-indolecarboxaldehyde.*—In the manner described in Example 145 treatment of 1-ethyl-4-hydroxy-2,5,6-trimethyl-3-indolecarboxaldehyde (Example 144) with potassium nitrosodisulfonate (8 mmole per mmole of substrate) gives orange needles, M.P. 125.127° C.

Example 148

*Preparation of 1-ethyl-2-methyl-4,7-dioxoindole.*—A solution of 218 mg. (1.25 mmole) of 1-ethyl-4-hydroxy-2-methylindole (Example 131) is added to a solution of 1.34 g. (5 mmole) of potassium nitrosodisulfonate in 80 ml. of M/18 potassium dihydrogen phosphate. After one hour the resulting mixture is diluted with water and extracted with methylene chloride. This extract is washed with water, dried, and concentrated and the residue is redissolved in methylene chloride and passed through a column filled with a magnesia-silica gel adsorbent. Concentration of the orange eluate gives on concentration 168 mg. (68%) of scarlet prisms, M.P. 86–87° C.

Example 149

*Preparation of 4,7-diacetoxy-1-ethyl-2-methylindole.*—To an ice-cooled mixture of 1.13 g. (6.0 mmole) of 1-ethyl-2-methyl-4,7-dioxoindole (Example 148), 1.1 g. of zinc dust and 10 ml. of acetic anhydride is added 0.5 ml. of pyridine. The resulting mixture is kept at room temperature for 30 minutes, then filtered into sodium bicarbonate solution. After the excess anhydride is hydrolyzed the mixture is extracted with methylene chloride. This extract is washed with sodium bicarbonate solution, dried and concentrated to afford 1.23 g. (75%) of yellow oil.

Example 150

*Preparation of 4,7-diacetoxy-1-ethyl-2-methyl-3-indolecarboxaldehyde.*—To an ice-cooled mixture of 690 mg. (4.5 mmole) of phosphorous oxychloride and 5 ml. of N,N-dimethylformamide is added dropwise a solution of 1.23 g. (4.5 mmole) of 4,7-diacetoxy-1-ethyl-2-methylindole (Example 149) in 10 ml. of N,N-dimethylformamide. The mixture is stirred one hour at this temperature and 30 minutes at room temperature, then poured into a mixture of 10% sodium carbonate solution and ice. The solid that forms is washed with water, dissolved in methylene chloride solution, washed with sodium bicarbonate solution, dried and concentrated. After the residue crystallizes it is washed with methanol, then recrystallized from methanol. This procedure gives 634 mg. (47%) of very pale blue prisms, M.P. 124–126° C.

Example 151

*Preparation of 1-ethyl-2-methyl-4,7-dioxo-3-indolecarboxaldehyde.*—A mixture of 606 mg. (2 mmole) of 4,7 - diacetoxy - 1-ethyl-2-methyl-3-indolecarboxaldehyde (Example 150), 80 mg. (2 mmole) of sodium hydroxide and 10 ml. of methanol is stirred under nitrogen for 10 minutes. The resulting solution is treated with 1.08 g. (4 mmole) of ferric chloride hexahydrate in 10 ml. of 0.2 N hydrochloric acid. A methylene chloride extract of the diluted mixture is washed with sodium bicarbonate solution, dried and concentrated to give 310 mg. (71%) of orange solid, M.P. 148–159° C.

Example 152

*Preparation of 5,6-dibromo-1-ethyl-3-formyl-2-methyl-4,7-dioxoindole.*— To an ice-cooled mixture of 1.085 g. of 1 - ethyl -2-methyl-4,7-dioxoindole-3-carboxaldehyde (Example 145), 3.28 g. of sodium acetate and 50 ml. of acetic acid is added 1.60 g. of bromine. After the resulting mixture is stirred at room temperature for 24 hours the red crystals that form are collected, washed with acetic acid-water, and recrystallized from methylene chloride-hexane. In this manner 470 mg. of dark red needles, M.P. 200–210° C. dec. are obtained.

Example 153

*Preparation of 5-bromo-1-ethyl-3-formyl-6-hydroxy-2-methyl-4,7-dioxoindole and 6-bromo-1-ethyl-3-formyl-5-hydroxy-2-methyl-4,7-dioxoindole.*—To a suspension of 303 mg. of 5,6-dibromo-1-ethyl-3-formyl-2-methyl-4,7-dioxoindole (Example 152) in 50 ml. of methanol is added a solution of 129.6 mg. of sodium hydroxide in 10 ml. of water. The mixture is warmed briefly on a steam bath, then stirred at room temperature for 2.5 hours. The resulting purple solution is extracted with methylene chloride and the aqueous layer is acidified with dilute hydrochloric acid and extracted with ethylene chloride. The latter extract is washed with water, dried, and concentrated and the residue is recrystallized from benzene to give 90 mg. of a mixture of 5-bromo-1-ethyl-3-formyl-6-hydroxy-2-methyl-4,7-dioxoindole and 6-bromo-1-ethyl-3-formyl-5-hydroxy-2-methyl-4,7-dioxoindole, M.P. 205–212° C. dec.

Example 154

*Preparation of 5-bromo-1-ethyl-3-formyl-6-methoxy-2-methyl-4,7-dioxoindole and 6-bromo-1-ethyl-3-formyl-5-methoxy-2-methyl-4,7-dioxoindole.*—To a solution of 653 mg. of a mixture of 5-bromo-1-ethyl-3-formyl-6-hydroxy-2-methyl-4,7-dioxoindole and 6-bromo-1-ethyl-3-formyl-5-hydroxy-2-methyl-4,7,-dioxoindole (Example 153) in 120 ml. of methylene chloride is added a solution of diazomethane (prepared from 472 mg. of N-nitroso-N-methyl-N'-nitroguanidine) in ether. After 30 minutes the resulting solution is extracted with 2% sodium bicarbonate solution, dried and concentrated. The residue is dissolved in 25 ml. of the upper phase and 25 ml. of the lower phase of the system heptane-methyl cellosolve, mixed with 50 g. of diatomaceous earth and packed atop a column prepared from 300 ml. of the lower phase and 600 g. of diatomaceous earth. Elution of this column with the upper phase gives in hold-back volume 5.6–7.2 (960 ml. per H.B.V.), after concentration and recrystallization 155 mg. of 5-bromo-1-ethyl-3-formyl-6-methoxy-2-methyl-4,7-dioxoindole as orange plates, M.P. 131–135° C. Concentration of hold-back volumes 7.4–8.4 gives 6-bromo-1- ethyl - 3-formyl-5-methoxy-2-methyl-4,7-dioxoindole as orange needles, M.P. 180–181° C.

Example 155

*Preparation of 1-ethyl-3-formyl-2,6-dimethyl-5-methylthio-4,7-dioxoindole.*—A solution of 870 mg. of 1-ethyl-3 - formyl-5-methoxy-2,6-dimethyl-4,7-dioxoindole (Example 108) in 25 ml. of acetic acid is treated with 1 ml. of concentrated hydrochloric acid and 2 ml. of methyl mercaptan. After 2 days the mixture is poured into a large volume of water and extracted with methylene chloride. This extract is washed with water and sodium bicarbonate solution, dried and concentrated. The residue is dissolved in methanol, treated with excess ferric chloride, diluted with water and extracted with methylene chloride. The red oil obtained on concentration of this extract is dissolved in 25 ml. of the upper and 37.5 ml. of the lower phase of the system methanol-heptane, mixed with 50 g. of diatomaceous earth and packed atop a column prepared from 375 ml. of the lower phase and 500 g. of diatomaceous earth. Elution of this column with the upper phase gives in hold-back volume 2.3–3.1 (750 ml. per H.B.V.), after concentration and recrystallization from hexane, 23 mg. of orange rods, M.P. 126–128° C.

Example 156

*Preparation of 1-ethyl-5-n-hexyloxy-2,6-dimethyl-4,7-dioxo-3-indolecarboxaldehyde.*—A mixture of 200 mg. of 1 - ethyl - 5-hydroxy-2,6-dimethyl-4,7-dioxo-3-indolecarboxaldehyde (Example 61), 1.0 ml. of tetra-n-hexyl-orthocarbonate and 2 ml. of xylene is heated at reflux temperature for 2 hours. The mixture is cooled, diluted with ether and extracted with 5% sodium bicarbonate solution and the organic layer is dried and concentrated. The oily residue is purified by absorption chromatography on a magnesia-silica gel column with methylene chloride containing 2% of acetone as eluent. Concentration of the orange eluate gives 206 mg. of viscous oil.

Example 157

*Preparation of 1-ethyl-2-methyl-5-p-toluenethio-4,7-dioxo-3-indolecarboxaldehyde, 1-ethyl-2-methyl-6-p-toluenethio-4,7-dioxo-3-indolecarboxaldehyde and 5,6-bis-p-toluenethio - 1 - ethyl-2-methyl-4,7-dioxo-3-indolecarboxaldehyde.*—A suspension of 4.34 g. (20 mmole) of 1-ethyl-2-methyl-4,7-dioxoindole-3-carboxaldehyde (Example 145) in 200 ml. of ethanol is treated with 1.87 g. (15 mmole) of p-toluenethiol and stirred at room temperature for 66 hours. It is then treated with 8.10 g. (30 mmole) of ferric chloride hexahydrate in 20 ml. of ethanol. After 20 minutes, an additional 1.24 g. (10 mmole) of p-toluenethiol is added, the mixture is stirred 16 hours and 4.05 g. (15 mmole) of ferric chloride hexahydrate in 10 ml. of ethanol is added. The mixture is diluted with water and extracted with methylene chloride. This extract is washed with water, dried and concentrated and the oily residue is treated with ether. Extraction of the residual solid with hot methanol leaves as insoluble brown solid 1.47 g. of 5,6 - bis - p - toluenethiol-1-ethyl-2-methyl-4,7-dioxo-3-indolecarboxaldehyde, M.P. 204° C. Partial concentration of the ether solution affords a solid that gives on recrystallization from methanol 245 mg. of 1-ethyl-2-methyl - 5-p-toluenethio-4,7-dioxo-3-indolecarboxaldehyde as red needles, M.P. 175–178° C. Complete concentration of the remaining ether solution gives a dark tar that is purified by adsorption chromatography on a magnesia-silica gel column with methylene chloride containing 5% acetone. Concentration of the eluate affords 2.92 g. of 1-ethyl-2-methyl-6-p-toluenethio-4,7-dioxo-3-indolecarboxaldehyde, M.P. 189–190° C. after recrystallization from methanol.

Example 158

*Preparation of 1-ethyl-6-hydroxy-2-methyl-4,7-dioxo-3-indolecarboxaldehyde.*—A mixture of 470 mg. of 1-ethyl-2 - methyl-6-p-toluenethio-4,7-dioxo-3-indolecarboxaldehyde (Example 157), 75 ml. of methanol, 10 ml. of water and 4.9 ml. of 10% sodium hydroxide solution is heated on a steam bath for 10 minutes, diluted with 500 ml. of water and extracted with methylene chloride. The aqueous phase is acidified with hydrochloric acid and extracted with methylene chloride and this extract is treated with 2% sodium bicarbonate solution. The resulting blue aqueous layer is acidified and extracted with methylene chloride and this extract is dried and concentrated. Treatment of the residue with ether gives 137 mg. of orange prisms that do not melt below 300° C.

Example 159

*Preparation of 1-ethyl-5-hydroxy-2-methyl-4,7-dioxo-3-indolecarboxaldehyde.*—In the manner described in Example 158 treatment of 1-ethyl-2-methyl-5-p-toluenethio-4,7-dioxo-3-indolecarboxaldehyde (Example 157) with methanolic sodium hydroxide gives orange prisms that do not melt below 300° C.

Example 160

*Preparation of 1-ethyl-6-methoxy-2-methyl-4,7-dioxo-3-indolecarboxaldehyde.*—To a solution of 156 mg. of 1-ethyl - 6-hydroxy-2-methyl-4,7-dioxo-3-indolecarboxaldehyde (Example 158) in 35 ml. of methylene chloride is added a solution of diazomethane (prepared from 142 mg. of N-nitroso-N-methyl-N'-nitroguanidine) in 15 ml. of ether. The resulting solution is kept overnight and then concentrated. Treatment of the residue with ether affords orange-red prisms, M.P. 165–175° C.

Example 161

*Preparation of 1-ethyl-5-methoxy-2-methyl-4,7-dioxo-3-indolecarboxaldehyde.*—In the manner described in Example 160 treatment of 1-ethyl-5-hydroxy-2-methyl-4,7-dioxo-3-indolecarboxaldehyde (Example 159) with diazomethane gives copper-colored plates, M.P. 159–168° C.

Example 162

*Preparation of 5-chloro-1-ethyl-2,6-dimethyl-4,7-dioxo-3-indolecarboxaldehyde.*—To an ice-cooled mixture of 1.22 g. (8 mmole) of phosphorous oxychloride and 4 ml. of N,N-dimethylformamide is added a solution of 988 mg. (4 mmole) of 1-ethyl-5-hydroxy-2,6-dimethyl-4,7-dioxo-3-indolecarboxaldehyde (Example 61) in 12 ml. of dimethylformamide. The mixture is heated on a steam bath for 30 minutes, cooled, poured onto ice and treated with methylene chloride and 5% sodium bicarbonate solution. The organic layer is washed with 5% sodium bicarbonate solution, dried and concentrated under reduced pressure. The residue is dissolved in 90% methylene chloride-10% acetone and passed through a magnesia-silica gel column (24 times 120 mm.). Concentration of the orange eluate affords orange prisms, M.P. 145–150° C.

Example 163

*Preparation of 1-ethyl-5-hydroxymethylene-2-methyl-4-oxo-4,5,6,7-tetrahydroindole.*—An ice - cooled suspension of 1.08 g. (20 mmole) of sodium methoxide in 10 ml. of dry benzene, under nitrogen, is treated with a solution of 1.48 g. (20 mmole) of ethyl formate in 5 ml. of benzene and a solution of 885 mg. (5 mmole) of 1-ethyl-2-methyl-4-oxo-4,5,6,7-tetrahydroindole (Example 129) in 10 ml. of benzene. The mixture is stirred at room temperature overnight, then cooled in an ice bath and treated with 20 ml. of 5% sodium hydroxide solution. The benzene layer is extracted with an additional 10 ml. of 5% sodium hydroxide solution and the combined alkaline extracts are cooled in an ice bath, layered with 20 ml. of benzene and acidified with 6 N hydrochloric acid. A pale yellow solid separates. This solid is combined with an additional quantity of solid obtained by concentrating the benzene layer, and recrystallized from methanol. This procedure affords white prisms, M. P. 82–90° C.

Example 164

*Preparation of 2,5-dimethyl-1-ethyl-4-oxo-4,5,6,7-tetrahydroindole.*—A mixture of 1.0 g. of 1-ethyl-5-hydroxymethylene-2-methyl-4-oxo-4,5,6,7 - tetrahydroindole (Example 163), 3.0 g. of powdered potassium carbonate, 30 ml. of acetone and 4 ml. of methyl iodide is stirred at room temperature overnight. It is then concentrated and the residue is treated with water and methylene chloride. The organic layer is washed with 1% sodium hydroxide solution and brine, dried and concentrated, affording 2,5 - dimethyl-1-ethyl-5-formyl-4-oxo-4,5,6,7-tetrahydroindole as a pale yellow oil. Without further purification this oil is converted to the deformylated product by heating it with 270 mg. of sodium methoxide in 20 ml. of methanol at reflux temperature for 2 hours. The resulting solution is concentrated and the residue is treated with water and methylene chloride. The organic layer is washed with water, dried and concentrated and the residue is purified by adsorption chromatography. This procedure gives 2,5-dimethyl-1-ethyl-4-oxo-4,5,6,7-tetrahydroindole as white crystals, M.P. 44–47° C.

Example 165

*Preparation of 2,5-dimethyl-1-ethyl-4-hydroxyindole.*—In the manner described in Example 131 treatment of 2,5-dimethyl-1-ethyl-4-oxo-4,5,6,7-tetrahydroindole (Example 164) with palladium-on-charcoal in cumene gives white needles, M.P. 110–112° C.

Example 166

*Preparation of 4-acetoxy-2,5-dimethyl-1-ethylindole.*—Treatment of 2,5-dimethyl-1-ethyl-4-hydroxyindole (Example 165) with sodium hydroxide, acetic anhydride and sodium acetate in the manner described in Example 136 gives a colorless oil.

Example 167

*Preparation of 4-acetoxy-2,5-dimethyl-1-ethyl-3-indolecarboxaldehyde.*—In the manner described in Example 139 treatment of 4-acetoxy-2,5-dimethyl-1-ethylindole (Example 166) with phosphorous oxychloride and dimethylformamide gives pale yellow crystals, M.P. 145–147° C.

Example 168

*Preparation of 2,5-dimethyl-1-ethyl-4-hydroxy-3-indolecarboxaldehyde.*—In the manner described in Example 142 treatment of 4-acetoxy-2,5-dimethyl-1-ethyl-3-indolecarboxaldehyde (Example 167) with methanolic sodium hydroxide gives pale yellow crystals, M.P. 133–135° C.

Example 169

*Preparation of 2,5-dimethyl-1-ethyl-4,7-dioxo-3-indolecarboxaldehyde.*—In the manner described in Example 145 treatment of 2,5-dimethyl-1-ethyl-4-hydroxy-3-indolecarboxaldehyde (Example 168) with potassium nitrosodisulfonate gives an orange product.

Example 170

*Preparation of 1 - ethyl - 2 - methyl-5-methylamino-4,7-dioxo - 3 - indolecarboxaldehyde and 1 - ethyl-2-methyl-6-methylamino - 4-7 - dioxo - 3 - indolecarboxaldehyde.*—A solution of 434 mg. of 1-ethyl-2-methyl-4,7-dioxo-3-indolecarboxaldehyde (Example 145) in 30 ml. of methanol is saturated with anhydrous methyl amine. After 20 minutes a solution of 540 mg. of ferric chloride hexahydrate in 2 ml. of methanol is added. The solution is allowed to stand for 1 hour, then is concentrated. The residue is treated with methylene chloride and water and the organic phase is dried and concentrated. Recrystallization of the residue from methylene chloride-hexane gives 265 mg. of a mixture of 1-ethyl-2-methyl-5-methylamino-4,7-dioxo-3-indolecarboxaldehyde and 1-ethyl-2-methyl - 6 - methylamino-4,7-dioxo-3-indolecarboxaldehyde as brownish-purple granular crystals that do not melt below 320° C.

Example 171

*Preparation of 6-amino-1-ethyl-2-methyl-4,7-dioxo-3-indolecarboxaldehyde.*—A solution of 1-ethyl-2-methyl-6-p-toluenethio-4,7-dioxo-3-indolecarboxaldehyde (Example 157) in methanol is saturated with anhydrous ammonia. After 5 hours the solution is concentrated and the residue is crystallized from methanol. This procedure affords brownish-purple granular crystals, M.P. 220° C.

What is claimed is:

1. A member of the class consisting of compounds of the formula:

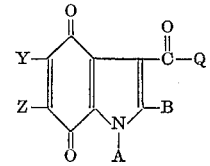

wherein A is selected from the group consisting of hydrogen, lower alkyl, ω-(halo)lower alkyl, ω-(lower alkylthio) lower alkyl, ω-(hydroxy)lower alkyl, ω-(tetrahydropyranyloxy)lower alkyl, ω-(azido)lower alkyl and ω-(mercapto)lower alkyl; B is selected from the group consisting of hydrogen, lower alkyl, hydroxmethyl, tetrahydropyranyloxymethyl, lower alkoxycarbonyl and carboxamido; Q is selected from the group consisting of hydrogen and lower alkyl; Y is selected from the group consisting of hydrogen, hydroxy, lower alkoxy, halogen, lower alkyl, lower alkylthio, lower alkylamino, phenylthio and p-(lower alkyl)phenylthio; and Z is selected from the group consisting of hydrogen, lower alkyl, amino, bromine, lower alkoxy, lower alkylamino, phenylthio and p-(lower alkyl)phenylthio.

2. 1 - ethyl-5-hydroxy-2,6-dimethyl-4,7-dioxo-3-indolecarboxaldehyde.

3. 1 - ethyl-5-methoxy-2,6-dimethyl-4,7-dioxo-3-indolecarboxaldehyde.

4. 3 - acetyl-1-ethyl-5-methoxy-2,6-dimethyl-4,7-dioxoindole.

5. 1-ethyl-2-methyl-4,7-dioxo-3-indolecarboxaldehyde.

6. 5-chloro-1-ethyl-2,6-dimethyl-4,7-dioxo-3-indolecarboxaldehyde.

7. 5-methoxy-2,6-dimethyl-4,7-dioxo-3-indolecarboxaldehyde.

8. 5,6 - dibromo - 1-ethyl-2-methyl-4,7-dioxo-3-indolecarboxaldehyde.

9. 1 - ethyl-6-methoxy-2-methyl-4,7-dioxo-3-indolecarboxaldehyde.

10. Methyl 1-ethyl-3-formyl-5-methoxy-6-methyl-4,7,-dioxo-2-indolecarboxylate.

11. 1 - ethyl-3-formyl-5-methoxy-6-methyl-4,7-dioxo-2-indolecarboxamide.

12. 1 - (β - chloroethyl) - 5 - methoxy-2,6-dimethyl-4,7-dioxo-3-indolecarboxamide.

No references cited.

NICHOLAS S. RIZZO, *Primary Examiner.*